United States Patent

Hayakawa

(10) Patent No.: US 8,339,712 B2
(45) Date of Patent: Dec. 25, 2012

(54) VARIABLE MAGNIFICATION OPTICAL SYSTEM, OPTICAL APPARATUS WITH THE SAME, AND METHOD FOR MANUFACTURING VARIABLE MAGNIFICATION OPTICAL SYSTEM

(75) Inventor: Satoshi Hayakawa, Chiba-ken (JP)

(73) Assignee: Nikon Corporation, Tokyo (JP)

(*) Notice: Subject to any disclaimer, the term of this patent is extended or adjusted under 35 U.S.C. 154(b) by 71 days.

(21) Appl. No.: 12/866,355

(22) PCT Filed: Apr. 22, 2009

(86) PCT No.: PCT/JP2009/058012
§ 371 (c)(1),
(2), (4) Date: Aug. 5, 2010

(87) PCT Pub. No.: WO2009/142090
PCT Pub. Date: Nov. 26, 2009

(65) Prior Publication Data
US 2010/0321791 A1 Dec. 23, 2010

(30) Foreign Application Priority Data

May 21, 2008 (JP) .................... 2008-133063

(51) Int. Cl.
*G02B 15/14* (2006.01)
(52) U.S. Cl. ........................................ 359/676

(58) Field of Classification Search .......... 359/676–679, 359/683–685
See application file for complete search history.

(56) References Cited

U.S. PATENT DOCUMENTS

| | | | |
|---|---|---|---|
| 2004/0125462 A1 | 7/2004 | Misaka | |
| 2007/0024985 A1 | 2/2007 | Misaka | |
| 2009/0067060 A1* | 3/2009 | Sudoh | 359/683 |

FOREIGN PATENT DOCUMENTS

| | | | |
|---|---|---|---|
| JP | 11-174327 | A | 7/1999 |
| JP | 11-223770 | A | 8/1999 |
| JP | 3054185 | B2 | 4/2000 |
| JP | 2000-221398 | A | 8/2000 |
| JP | 2003-015038 | A | 1/2003 |
| JP | 2003-241098 | A | 8/2003 |
| JP | 2004-198529 | A | 7/2004 |
| JP | 2004-212612 | A | 7/2004 |

\* cited by examiner

*Primary Examiner* — Darryl J Collins
(74) *Attorney, Agent, or Firm* — Miles and Stockbridge P.C.

(57) ABSTRACT

Provided are a variable magnification optical system for making it possible to properly set a variable magnification ratio of each lens group by properly setting a variable magnification ratio of a fifth lens group, and an optical apparatus with the variable magnification optical system, and a method for manufacturing the variable magnification optical system. The optical apparatus has first to sixth lens groups (G1) to (G6) in order from an object, wherein the fifth lens group (G5) satisfies the following conditional expression: $0.65<|\beta 5T/\beta 5W|<3.20$, where $\beta 5T$ denotes the lateral magnification at the telephoto end state, and $\beta 5W$ denotes the lateral magnification at the wide-angle end state.

17 Claims, 30 Drawing Sheets

(EXAMPLE 1)

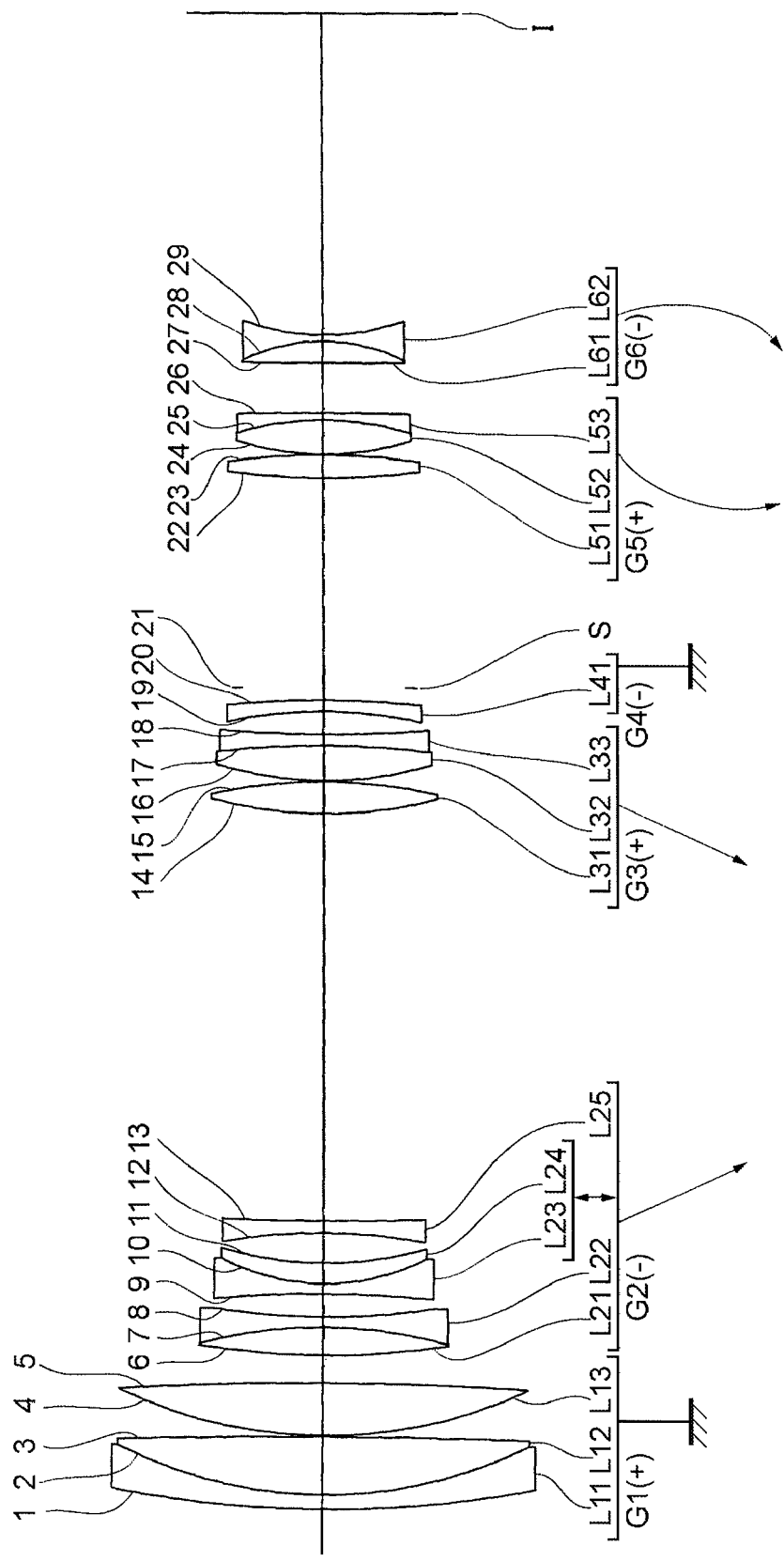

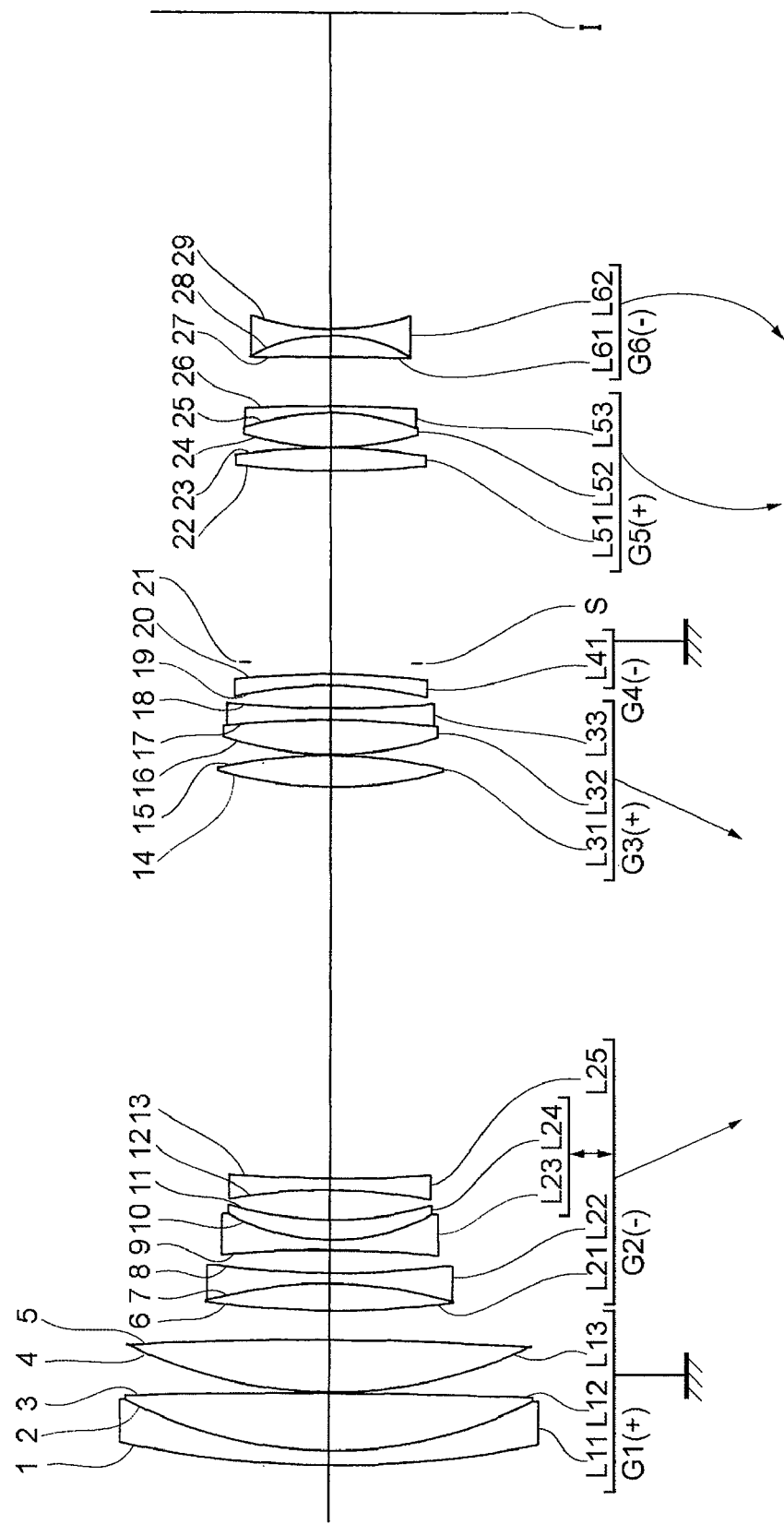

Fig.12A
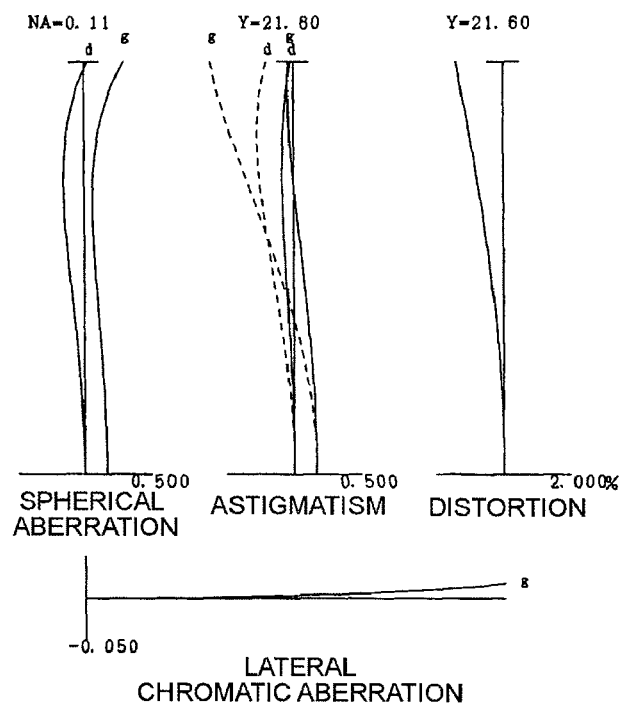
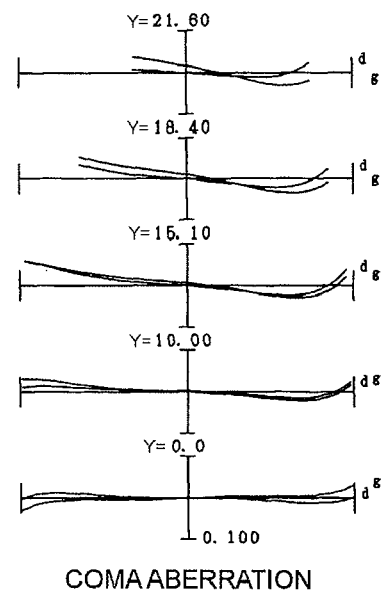
Fig.12B
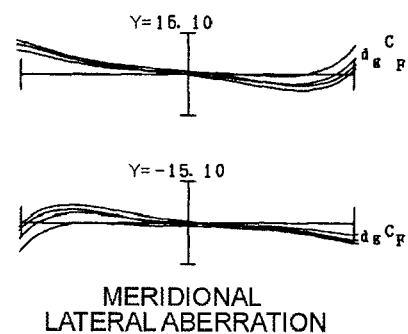

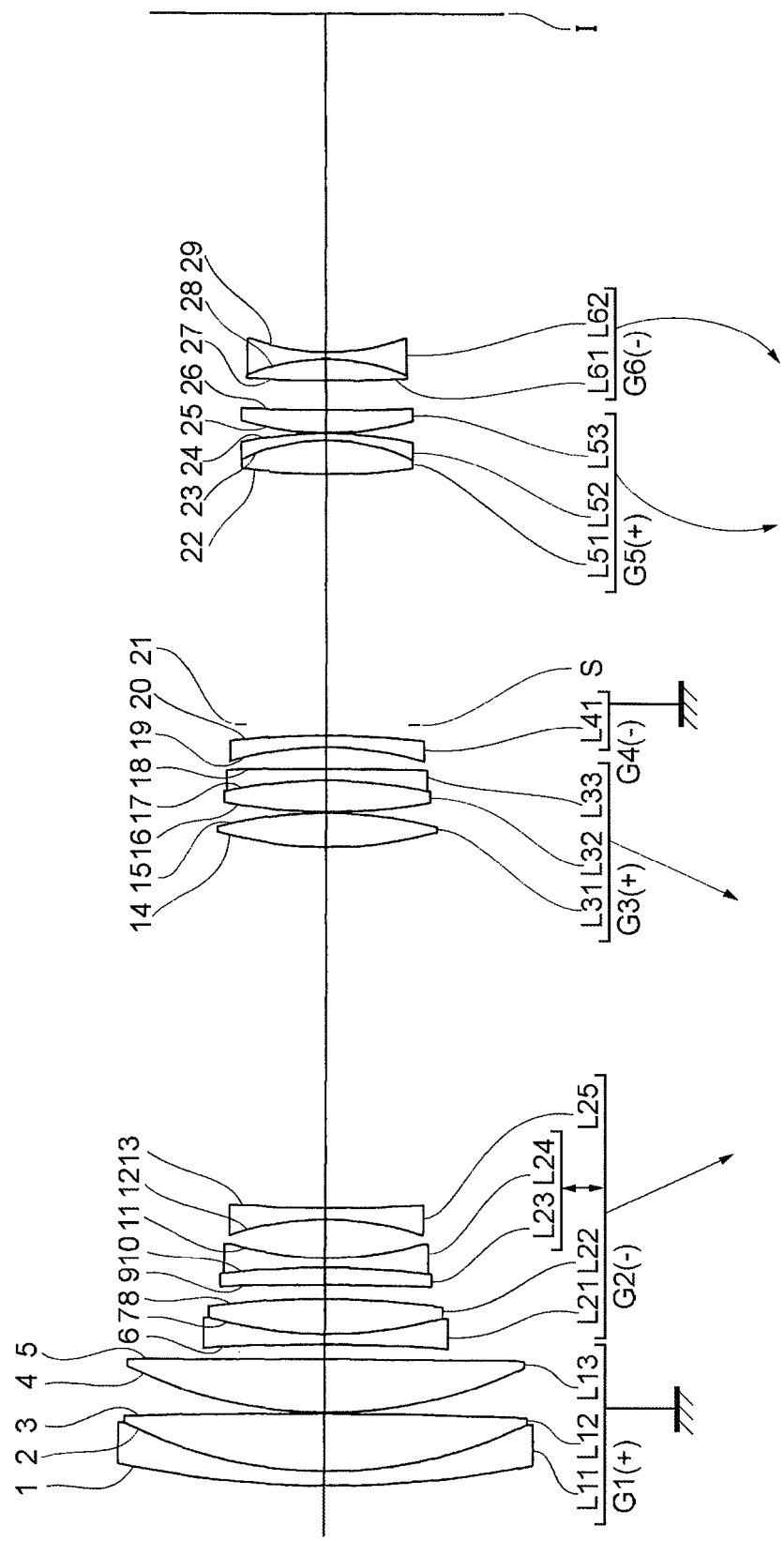

Fig.23A
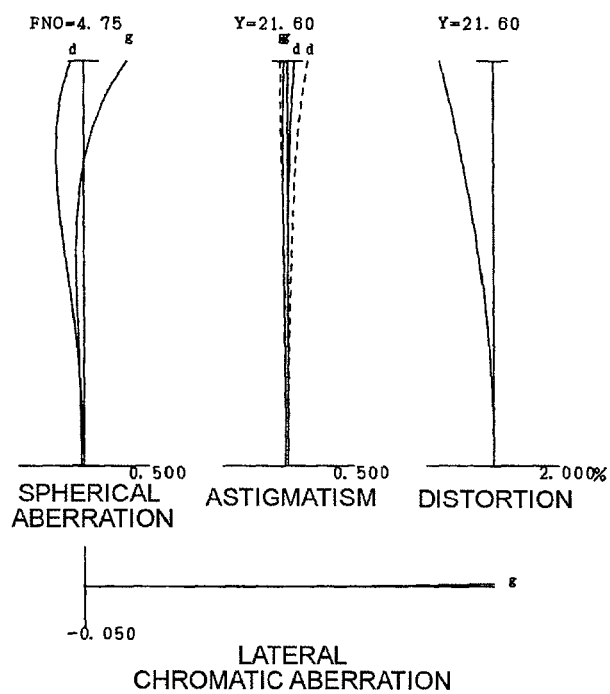
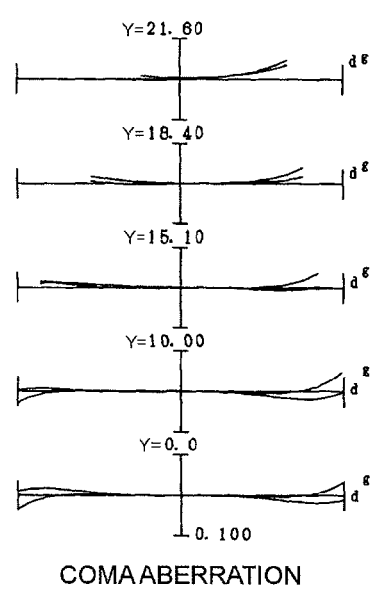
Fig.23B
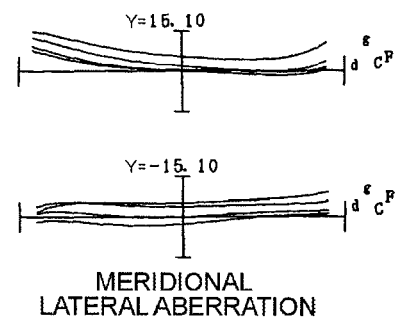

VARIABLE MAGNIFICATION OPTICAL SYSTEM, OPTICAL APPARATUS WITH THE SAME, AND METHOD FOR MANUFACTURING VARIABLE MAGNIFICATION OPTICAL SYSTEM

TECHNICAL FIELD

The present invention relates to a variable magnification optical system, optical apparatus with this variable magnification optical system, and method for manufacturing the variable magnification optical system.

BACKGROUND ART

As a variable magnification method for a variable magnification optical system, a variable magnification method using a multi-group zoom lens constituted by five or more lens groups, is available (e.g. see Patent Documents 1 and 2). In the case of this variable magnification method, which uses many constituting lens groups, each group shares variable magnification, and variable magnification can more easily be implemented.

CITATION LIST

Patent Document

Patent Document 1 Japanese Patent No. 3054185
Patent Document 2 Japanese Laid-Open Patent Publication No. H11-223770

SUMMARY OF INVENTION

Problems to be Solved by the Invention

In Patent Document 1, the variable magnification ratios of the second and fourth lens groups are set high, and the variable magnification ratio of the fifth lens group is set low. In Patent Document 2, the variable magnification ratios of the third and fourth lens groups are set low, and the variable magnification ratio of the fifth lens group is set high.

In this way, according to the conventional multi-group zoom lens, the variable magnification ratio of a specific lens group is high and the variable magnification is executed by this lens group, while the variable magnification ratios of the other lens groups are low, and the variable magnification ratios of each lens group are not set properly.

With the foregoing in view, it is an object of the present invention to provide a variable magnification optical system that can properly set a variable magnification ratio of each lens group by properly setting a variable magnification ratio of a fifth lens group and an optical apparatus with this variable magnification optical system, and a method for manufacturing the variable manufacturing optical system.

Disclosure of the Invention

To achieve this object, a variable magnification optical system has a first to sixth lens groups disposed along an optical axis, and the fifth lens group satisfies the following conditional expression: $0.65<|\beta 5T/\beta 5W|<3.20$, where $\beta 5T$ denotes a lateral magnification at a telephoto end state and $\beta 5W$ denotes a lateral magnification at a wide-angle end state.

It is preferable that the following conditional expression is satisfied: $2.90<TLW/fW<6.60$, where TLW denotes a total length of the variable magnification optical system at the wide-angle end state, and fW denotes a focal length of the variable magnification optical system at the wide-angle end state.

It is preferable that the following conditional expression is satisfied: $0.643<TLT/fT<0.692$, where TLT denotes a total length of the variable magnification optical system at the telephoto end state, and fT denotes a focal length of the variable magnification optical system at the telephoto end state.

It is preferable that a distance between the first lens group and the second lens group increases, a distance between the second lens group and the third lens group decreases, and a distance between the third lens group and the fourth lens group increases upon zooming from the wide-angle end state to the telephoto end state.

It is preferable that a lens group disposed closest to an object has positive refractive power.

It is preferable that the lens group disposed closest to the object is fixed in an optical axis direction with respect to an image plane upon zooming from the wide-angle end state to the telephoto end state.

It is preferable that the second lens group satisfies the following conditional expression: $\beta 2T/\beta 2W<6.100$, where $\beta 2T$ denotes a lateral magnification at the telephoto end state and $\beta 2W$ denotes a lateral magnification at the wide-angle end state.

It is preferable that the following conditional expression is satisfied: $|f3/f2|<1.800$, where f2 denotes a focal length of the second lens group and f3 denotes a focal length of the third lens group.

It is preferable that a lens group disposed to the object side of the fifth lens group has negative refractive power.

It is preferable that a lens group disposed to an image side of the fifth lens group has negative refractive power.

It is preferable that the second lens group has negative refractive power, and the third lens group and the fifth lens group have positive refractive power.

It is preferable that the fourth lens group is fixed in the optical axis direction with respect to the image plane upon zooming from the wide-angle end state to the telephoto end state.

It is preferable that a stop is disposed to the object side or the image side of the fourth lens group, and is fixed in the optical axis direction with respect to the image plane upon zooming from the wide-angle end state to the telephoto end state.

It is preferable that all or a part of the second lens group is moved so as to have a component perpendicular to the optical axis.

It is preferable that focusing is performed by moving the fifth lens group.

An optical apparatus of the present invention has the Above mentioned variable magnification optical system.

A method for manufacturing a variable magnification optical system according to the present invention has a step of disposing a first to sixth lens groups along an optical axis, and the fifth lens group is disposed so as to satisfy the following conditional expression: $0.65<|\beta 5T/\beta 5W|<3.20$, where $\beta 5T$ denotes a lateral magnification at a telephoto end state and $\beta 5W$ denotes a lateral magnification at a wide-angle end state.

Advantageous Effects of the Invention

According to the present invention, a variable magnification optical system for making it possible to properly set a variable magnification ratio of each lens group by properly setting a variable magnification ratio of a fifth lens group, an optical apparatus with this variable magnification optical system and variable magnification method for this variable magnification optical system, can be provided.

BRIEF DESCRIPTION OF THE DRAWINGS

FIG. 1 is a diagram depicting a configuration and zoom locus of the variable magnification optical system according to Example 1;

FIG. 8 is a diagram depicting a configuration and zoom locus of the variable magnification optical system according to Example 2;

FIG. 12A and FIG. 12B are graphs showing various aberrations of the variable magnification optical system according to Example 2 upon focusing on short range at the wide-angle end state, and graphs showing meridional lateral aberrations when blur correction is performed;

FIG. 15 is a diagram depicting a configuration and zoom locus of the variable magnification optical system according to Example 3;

FIG. 23A and FIG. 23B are graphs showing various aberrations of the variable magnification optical system according to Example 4 upon focusing on infinity at the wide-angle end state, and graphs showing meridional lateral aberrations when blur correction is performed;

DESCRIPTION OF EMBODIMENTS

Figure 2A:
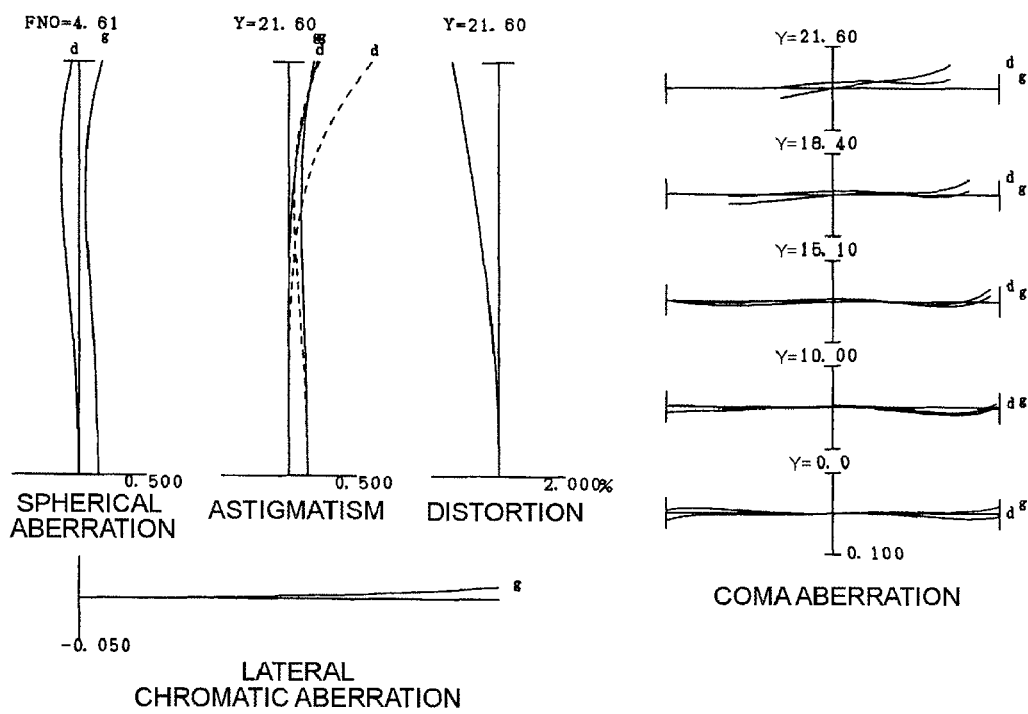
FIG. 2A and FIG. 2B are graphs showing various aberrations of the variable magnification optical system according to Example 1 upon focusing on infinity at the wide-angle end state, and graphs showing meridional lateral aberrations when blur correction is performed.

Preferred embodiments will now be described with reference to the drawings.

First the share in the variable magnification ratio by each lens group in a variable magnification optical system will be described. Generally the focal length f of this optical system is given by the following conditional expression (a), where f denotes a focal length of this optical system of the variable magnification optical system, f1 denotes a focal length of a first lens group G1, i (i=1, 2, . . . n) denotes a number of lens groups, and βi denotes a lateral magnification of the i-th lens group.

$$f = f1 \times \beta 2 \times \beta 3 \ldots \times \beta n \quad (a)$$

If the variable magnification optical system is constituted by six lens groups (n=6), for example, the focal length fW of the total system at the wide-angle end state is given by the following conditional expression (b), where βiW denotes a lateral magnification of the i-th lens group (i=1, 2, . . . 6) at the wide-angle end state.

$$fW = f1 \times \beta 2W \times \beta 3W \times \beta 4W \times \beta 5W \times \beta 6W \quad (b)$$

If the variable magnification optical system is constituted by six lens groups (n=6), the focal length fT of this optical system at the telephoto end state is given by the following conditional expression (c), where βiT denotes a lateral magnification of the i-th lens group (i=1, 2, . . . 6) at the telephoto end state.

$$fT = f1 \times \beta 2T \times \beta 3T \times \beta 4T \times \beta 5T \times \beta 6T \quad (c)$$

The variable magnification ratio Zi of the i-th lens group (i=1, 2, . . . n) is a ratio of the lateral magnification βiT at the telephoto end state and the lateral magnification βiW at the wide-angle end state, and is given by the following expression (d).

$$Zi = \beta iT/\beta iW \quad (d)$$

Therefore the variable magnification ratio Z of this variable magnification optical system is given by the following expression (e).

$$Z = \frac{fT}{fW} \quad (e)$$
$$= \left(\frac{\beta 2T}{\beta 2W}\right) \cdot \left(\frac{\beta 3T}{\beta 3W}\right) \cdot \left(\frac{\beta 4T}{\beta 4W}\right) \cdot \left(\frac{\beta 5T}{\beta 5W}\right) \cdot \left(\frac{\beta 6T}{\beta 6W}\right)$$
$$= Z2 \times Z3 \times Z4 \times Z5 \times Z6$$

As the above expression (e) shows, if the variable magnification ratio Zi of a specific lens group is the same as the variable magnification ratio Z of this optical system, for example, the variable magnification ratios Zi of the other lens groups can all be 1. If the variable magnification ratio Zi of a specific lens group is greater than the variable magnification ratio Z of this variable magnification optical system, the variable magnification ratios Zi of the other lens groups are smaller than 1, which does not contribute to increasing the variable magnification ratio Z. It is therefore not preferable that the variable magnification ratio Zi of a specific lens group is dramatically high, and the variable magnification ratios Zi of the other lens groups are dramatically low like this. Hence according to the variable magnification optical system of this embodiment, it is preferable that each lens group shares the variable magnification by properly setting a variable magnification ratio for each lens group, so as to implement a predetermined variable magnification ratio Z.

Therefore this embodiment has a first lens group G1 to a sixth lens group G6 in order from an object, as shown in FIG. 1, and the fifth lens group G5 satisfies the conditional expression (1), where β5T denotes a lateral magnification at the telephoto end state and β5W denotes a lateral magnification at the wide-angle end state.

$$0.65 < |\beta 5T/\beta 5W| < 3.20 \quad (1)$$

This conditional expression (1) specifies a ratio of the lateral magnification β5T of the fifth lens group G5 at the telephoto end state and the lateral magnification β5W of the fifth lens group G5 at the wide-angle end state. This variable magnification optical system can implement a good optical performance by satisfying this conditional expression (1). If the upper limit value of the conditional expression (1) is exceeded, the variable magnification ratio of the fifth lens group G5 increases and the variable magnification ratios of the other lens groups decrease, which makes it difficult to correct the spherical aberration. If the lower limit value of the conditional expression (1) is not reached, the variable magnification ratio of the fifth lens group G5 decreases and the variable magnification ratios of the other lens groups increase, which makes it difficult to correct the coma aberration.

To make the effect of this embodiment more certain, it is preferable to satisfy β5T/β5W>0. To make the effect of this embodiment more certain, it is also preferable to set the lower limit value of the conditional expression (1) to 0.90. And to make the effect of this embodiment more certain, it is also preferable to set the upper limit value of the conditional expression (1) to 3.00.

In this embodiment, it is preferable to satisfy the following conditional expression (2), where TLW denotes the total length of the variable magnification optical system at the wide-angle end state and fW denotes the focal length of the variable magnification optical system at the wide-angle end state.

$$2.90 < TLW/fW < 6.60 \quad (2)$$

This conditional expression (2) specifies a ratio of the total length TLW of the variable magnification optical system at the wide-angle end state and the focal length fW of the variable magnification optical system at the wide-angle end state. This variable magnification optical system can implement a good optical performance by satisfying this conditional expression (2). In the wide-angle end state, this variable magnification optical system has a retro focus type power arrangement, and if the upper limit value of the conditional expression (2) is exceeded, the retro focus type power arrangement is further intensified, which makes it difficult to correct distortion. If the lower limit value of the conditional expression (2) is not reached, the total length of the variable magnification optical system decreases, which makes it difficult to correct the spherical aberration.

To make the effect of this embodiment more certain, it is preferable to set the lower limit value of the conditional expression (2) to 3.00. And to make the effect of this embodiment more certain, it is also preferable to set the upper limit value of the conditional expression (2) to 6.00.

In this embodiment, it is preferable to satisfy the following conditional expression (3), where TLT denotes the total length of the variable magnification optical system at the telephoto end state and fT denotes the focal length of the variable magnification optical system at the telephoto end state.

$$0.643 < TLT/fT < 0.692 \qquad (3)$$

This conditional expression (3) specifies a ratio of the total length TLT of the variable magnification optical system at the telephoto end state, and the focal length fT of the variable magnification optical system at the telephoto end state. This variable magnification optical system can implement a good optical performance by satisfying this conditional expression (3). At the telephoto end state, this variable magnification optical system has a telephoto type power arrangement, and if the upper limit value of the conditional expression (3) is exceeded, the total length of the variable magnification optical system increases and the system becomes large, which makes it difficult to correct axial chromatic aberration. If the lower limit value of the conditional expression (3) is not reached, the telephoto type power arrangement is further intensified, which makes it difficult to correct spherical aberration.

To make the effect of this embodiment more certain, it is preferable to set the lower limit value of the conditional expression (3) to 0.644. And to make the effect of this embodiment more certain, it is also preferable to set the upper limit value of the conditional expression (3) to 0.690.

In this embodiment, it is preferable that the distance between the first lens group G1 and the second lens group G2 increases, the distance between the second lens group G2 and the third lens group G3 decreases, and the distance between the third lens group G3 and the fourth lens group G4 increases upon zooming from the wide-angle end state to the telephoto end state. Thereby it becomes easier to correct the curvature of field and distortion.

In this embodiment, it is preferable that the lens group disposed closest to the object (first lens group G1 in this embodiment) has positive refractive power. Thereby the total length of the variable magnification optical system can be decreased. Also it becomes easier to correct distortion.

As a variable magnification method for the variable magnification optical system, a method for moving the first lens group, disposed closest to the object, to the object side upon zooming from the wide-angle end state to the telephoto end state, is available. This is because moving the first lens group makes it easier to correct such aberrations as curvature of field. However a problem of the method for moving the first lens group is that decentering tends to occur when moving the first lens group.

Therefore in this embodiment, it is preferable that the lens group disposed closest to the object (first lens group G1 in this embodiment) is fixed in the optical axis direction with respect to an image plane I upon zooming from the wide-angle end state to the telephoto end state. If the first lens group G1 is fixed in the optical axis direction with respect to the image plane I like this, decentering is decreased. This makes it possible to suppress a drop in performance due to decentering, and in particular, a decrease in curvature of field, therefore good optical performance can be implemented. Further, operability improves since the heavy first lens group G1 is fixed in the optical axis direction with respect to the image plane. In concrete terms, three major problems are solved: Change of weight balance caused by the movement of the heavy first lens group G1; unintentional change of angle of view; and drop of the first lens group G1 by its own weight. Improvements in safeguards against unexpected shocks applied to the lens can also be expected.

In this embodiment, it is preferable that the second lens group G2 satisfies the following conditional expression (4), where β2T denotes a lateral magnification at the telephoto end state and β2W denotes a lateral magnification at the wide angle end state.

$$\beta 2T/\beta 2W < 6.100 \qquad (4)$$

Conditional expression (4) specifies a ratio of the lateral magnification β2T of the second lens group G2 at the telephoto end state and the lateral magnification β2W of the second lens group G2 at the wide-angle end state. This variable magnification optical system can implement a good optical performance by satisfying this conditional expression (4). If the upper limit value of the conditional expression (4) is exceeded, the variable magnification ratio of the second lens group G2 increases, and the variable magnification ratios of the lens groups other than the second lens group G2 decrease, which makes it difficult to correct the spherical aberration.

To make the effect of this embodiment more certain, it is preferable to set the upper limit value of the conditional expression (4) to 5.700.

In this embodiment, it is preferable to satisfy the following conditional expression (5), where f2 is the focal length of the second lens group G2 and f3 is the focal length of the third lens group G3.

$$|f3/f2| < 1.800 \qquad (5)$$

This conditional expression (5) specifies a ratio of the focal length f3 of the third lens group G3 and the focal length f2 of the second lens group G2. This variable magnification optical system can implement a good optical performance by satisfying this conditional expression (5). If the upper limit value of the conditional expression (5) is exceeded, the focal length f2 of the second lens group G2 decreases and the total length of the variable magnification optical system increases, which makes it difficult to correct curvature of field.

To make the effect of this embodiment more certain, it is preferable to set the upper limit value of the conditional expression (5) to 1.796.

In this embodiment, it is preferable that the lens group disposed to the object side of the fifth lens group G5 (fourth lens group G4 in this embodiment) has negative refractive power. This makes it easier to correct the spherical aberration, therefore good optical performance can be implemented.

In this embodiment, it is preferable that the lens group disposed to the image side of the fifth lens group G5 (e.g. sixth lens group G6) has negative refractive power. This makes it easier to correct curvature of field, therefore good optical performance can be implemented.

In this embodiment, it is preferable that the second lens group G2 has negative refractive power, and the third lens group G3 and the fifth lens group G5 have positive refractive power. This makes it easier to correct spherical aberration, curvature of field and coma aberration, therefore good optical performance can be implemented.

In this embodiment, it is preferable that the fourth lens group G4 is fixed in the optical axis direction with respect to the image plane I upon zooming from the wide-angle end state to the telephoto end state. This decreases decentering, and makes it possible to suppress a drop in performance due to decentering, and in particular, a decrease in spherical aberration, therefore good optical performance can be implemented.

In this embodiment, it is preferable that an aperture stop S is fixed in the optical axis direction with respect to the image plane I upon zooming from the wide-angle end state to the telephoto end state. This makes it easier to construct the variable magnification optical system. As a result, accuracy of the aperture stop diameter improves, and adjustment of luminous flux and spherical Aberration by the aperture stop S becomes easier, therefore good optical performance can be implemented.

In this embodiment, it is preferable that all or a part of the second lens group G2 is moved so as to have a component perpendicular to the optical axis. This makes it possible to correct the image plane when an image blur is generated, therefore good optical performance can be implemented.

In this embodiment, it is preferable that focusing is performed by moving the fifth lens group G5. In this embodiment, the fifth lens group G5 is lighter than the first lens group G1, for example, so focusing can be performed at high-speed. Since the fifth lens group G5, which is the focusing lens group, is light, an ultrasonic motor can be selected, and quiet focusing can be implemented.

Figure 29:
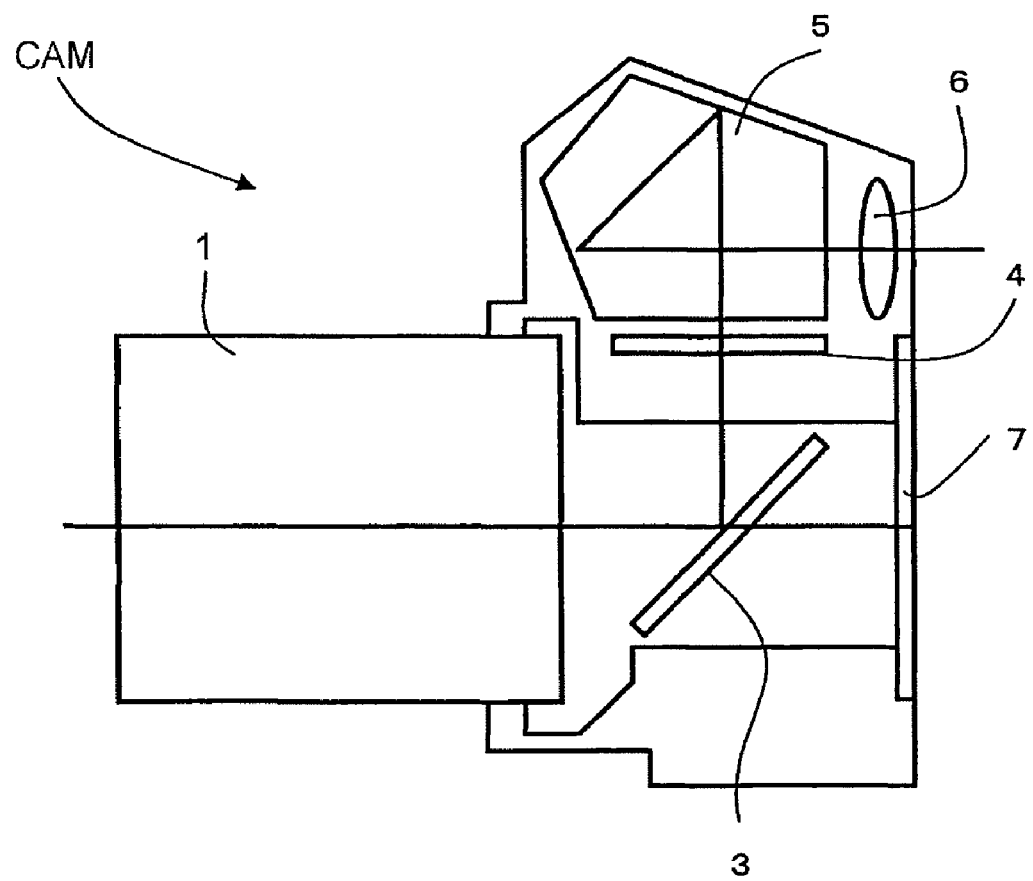
FIG. 29 is a cross-sectional view depicting a digital single-lens reflex camera CAM having the variable magnification optical system with the above mentioned configuration as a camera lens.

FIG. 29 shows a cross-sectional view depicting a digital single-lens reflex camera CAM (optical apparatus) having the variable magnification optical system with the above mentioned configuration as a camera lens 1. In the digital single-lens reflex camera CAM shown in FIG. 29, the light from an object, which is not illustrated, is collected by the camera lens 1 and forms an image on a focal plane plate 4 through a quick return mirror 3. The light that formed an image on the focal plane plate 4 is reflected several times in a penta prism 5, and is guided to an eye piece 6. Thereby a user can observe the object image via the eye piece 6 as an erect image.

When the user presses a release button, which is not illustrated, a quick return mirror 3 is withdrawn from the optical path, which is not illustrated, and the light from the object, which is not illustrated, collected by the camera lens 1, forms an image of the object on a picture element 7. As a result, the light from the object is picked up by the picture element 7, and is recorded on a memory, which is not illustrated, as an object image. In this way, the user can photograph the object using this camera CAM. The camera CAM in FIG. 29 may have a removable camera lens 1, or may be molded together with the camera lens 1. The camera CAM may be a single-lens reflex camera, or may be a compact camera which has no quick return mirror.

EXAMPLES

Each example of this embodiment will now be described with reference to the drawings. Table 1 to Table 4 shown below are tables on individual data of Example 1 to Example 4. In [General Data], f denotes a focal length of this optical system, FNO denotes the F number, TL denotes the total length of this optical system, and 2ω denotes a full angle of view. In [Lens Data], the surface number indicates a sequence of a lens surface from the object side along the light traveling direction, r denotes a radius of curvature of each lens surface, d denotes a surface distance, which is a distance on the optical axis from each optical surface to the next optical surface (or the image plane), nd denotes a refractive index at the d-line (wavelength: 587.6 nm), vd denotes an Abbe number at the d-line, aperture stop S denotes an aperture stop, and BF denotes a back focus. "0.0000" in the radius of curvature shows a plane or an aperture. In [Variable Distance Data], f denotes a focal length of this optical system, β denotes a lateral magnification of this optical system, and Di (i is an integer) denotes a variable surface distance of the i-th surface.

In [Each Group Focal Length Data], the first surface, focal length and variable magnification ratio of each group are shown. In [Conditional Expression Correspondence Value], values corresponding to the conditional expressions (1) to (5) are shown.

In the tables, "mm" is normally used for the unit of the focal length f, radius of curvature r, surface distance d and other lengths. However the unit is not limited to "mm", but another appropriate unit can be used instead, since an equivalent optical performance is obtained even if an optical system is proportionally expanded or proportionally reduced.

The above description on the table is the same for all other examples, therefore redundant description will be omitted.

Example 1

Example 1 will now be described with reference to FIG. 1 to FIG. 7 and Table 1. FIG. 1 is a diagram depicting a configuration and zoom locus of the lens according to Example 1. As FIG. 1 shows, a variable magnification optical system according to Example 1 has, in order from an object, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power.

The first lens group G1 has, in order from the object, a cemented lens of a negative meniscus lens L11 having a convex surface facing the object and a biconvex positive lens L12, and a biconvex positive lens L13. The second lens group G2 has, in order from the object, a cemented lens of a biconvex positive lens L21 and a biconcave negative lens L22, a cemented lens of a biconcave negative lens L23 and a positive meniscus lens L24 having a convex surface facing the object, and a biconcave negative lens L25. The third lens group G3 has, in order from the object, a biconvex positive lens L31, and a cemented lens of a biconvex positive lens L32 and a biconcave negative lens L33. The fourth lens group G4 has, in order from the object, a negative meniscus lens L41 having a concave surface facing the object. The fifth lens group G5 has, in order from the object, a biconvex positive lens L51, and a cemented lens of a biconvex positive lens L52 and a negative meniscus lens L53 having a concave surface facing the object. The sixth lens group G6 has, in order from the object, a cemented lens of a biconvex positive lens L61, and a biconcave negative lens L62.

In the variable magnification optical system according to this example having the above configuration, each lens group moves upon zooming from the wide-angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 increases once and then decreases. The first lens group G1 and the fourth lens group G4 are fixed with respect to the image plane I upon zooming from the wide-angle end state to the telephoto end state.

The aperture stop S is disposed between the fourth lens group G4 and the fifth lens group G5, and is fixed with respect to the image plane I upon zooming from the wide-angle end state to the telephoto end state.

In the variable magnification optical system according to this example, the image plane, when a blur is generated, is corrected by shifting the cemented lens of the lens L23 and the lens L24 in the second lens group G2 in a direction perpendicular to the optical axis. In order to correct the angle θ of rotation blur with a lens of which blur correction coefficient (ratio of moving distance of the image on the image plane to moving distance of the blur correction lens group in the optical axis direction) is K, when the focal length of this optical lens system is f, the blur correction lens group is moved by (f·tan θ)/K in a direction perpendicular to the optical axis. At the wide-angle end state of this example, the blur correction coefficient K is −0.890 and the focal length is 81.6 (mm), so the moving distance of the cemented lens of the lens L23 and the lens L24 for correcting the 0.350° of rotation blur is −0.560 (mm). At the wide-angle end state of this example, the blur correction coefficient K is −2.500 and the focal length is 392 (mm), so the moving distance of the cemented lens of the lens L23 and the lens L24 for correcting 0.160° of rotation blur is −0.437 (mm).

Table 1 shows the value of each data of the variable magnification optical system according to Example 1. The surface numbers 1 to 29 in Table 1 correspond to the surfaces 1 to 29 shown in FIG. 1.

TABLE 1

[General Data]

| | Wide-angle end state | | Intermediate focal length state | | Telephoto end state |
|---|---|---|---|---|---|
| f | 81.6 | ~ | 200 | ~ | 392 |
| FNO | 4.6 | ~ | 5.4 | ~ | 5.8 |
| TL | 258 | ~ | 258 | ~ | 258 |
| 2ω | 30.0 | ~ | 12.0 | ~ | 6.1 |

[Lens Data]

| Surface number | r | d | nd | νd |
|---|---|---|---|---|
| 1 | 179.6360 | 2.5 | 1.83400 | 37.2 |
| 2 | 74.9086 | 10.0 | 1.49782 | 82.6 |
| 3 | −1035.6800 | 0.2 | 1.00000 | |
| 4 | 79.3505 | 9.0 | 1.49782 | 82.6 |
| 5 | −556.1685 | D5 | 1.00000 | |
| 6 | 133.4658 | 4.8 | 1.78472 | 25.7 |
| 7 | −77.0017 | 1.8 | 1.80440 | 39.6 |
| 8 | 123.6346 | 4.0 | 1.00000 | |
| 9 | −175.3368 | 1.7 | 1.64000 | 60.1 |
| 10 | 37.3811 | 3.5 | 1.72825 | 28.5 |
| 11 | 60.8225 | 5.2 | 1.00000 | |
| 12 | −91.0525 | 2.0 | 1.79500 | 45.3 |
| 13 | 433.3106 | D13 | 1.00000 | |
| 14 | 73.1265 | 5.5 | 1.51680 | 64.1 |
| 15 | −83.8137 | 0.2 | 1.00000 | |
| 16 | 61.0089 | 6.0 | 1.51680 | 64.1 |
| 17 | −145.1031 | 2.0 | 1.80518 | 25.4 |
| 18 | 209.2002 | D18 | 1.00000 | |
| 19 | −72.8028 | 2.0 | 1.48749 | 70.5 |
| 20 | −154.9070 | 2.0 | 1.00000 | |
| 21 | 0.0000 | D21 | 1.00000 | (Aperture stop S) |
| 22 | 121.3551 | 4.0 | 1.48749 | 70.5 |
| 23 | −103.9676 | 0.1 | 1.00000 | |
| 24 | 48.3824 | 6.0 | 1.48749 | 70.5 |
| 25 | −47.3576 | 1.2 | 1.83400 | 37.2 |
| 26 | −522.9009 | D26 | 1.00000 | |
| 27 | 1784.6923 | 3.7 | 1.80518 | 25.4 |
| 28 | −30.0632 | 1.1 | 1.79500 | 45.3 |
| 29 | 39.3186 | BF | 1.00000 | |

TABLE 1-continued

[Variable Distance Data]

| | Infinity | | | Short range | | |
|---|---|---|---|---|---|---|
| | Wide angle end | Intermediate | Telephoto end | Wide angle end | Intermediate | Telephoto end |
| f | 81.6 | 200 | 392 | — | — | — |
| β | 0 | 0 | 0 | −0.0333 | −0.0333 | −0.0333 |
| D0 | 0 | 0 | 0 | 2353.99 | 5834.28 | 11543.45 |
| D5 | 4.81 | 34.24 | 49.46 | 4.81 | 34.24 | 49.46 |
| D13 | 70.20 | 31.01 | 2.00 | 70.20 | 31.01 | 2.00 |
| D18 | 3.99 | 13.75 | 27.54 | 3.99 | 13.75 | 27.54 |
| D21 | 36.42 | 20.56 | 15.83 | 35.68 | 19.22 | 13.53 |
| D26 | 8.55 | 9.74 | 2.00 | 9.29 | 11.09 | 4.30 |
| BF | 55.56 | 70.22 | 82.69 | 55.56 | 70.22 | 82.69 |

[Each Group Focal Length Data]

| Group Number | First surface of group | Focal length of group | Variable magnification ratio |
|---|---|---|---|
| G1 | 1 | 129.25 | — |
| G2 | 6 | −39.81 | 3.25 |
| G3 | 14 | 61.69 | 1.20 |
| G4 | 19 | −284.03 | 0.93 |
| G5 | 22 | 74.76 | 1.05 |
| G6 | 27 | −51.54 | 1.25 |

[Conditional Expression Correspondence Value]

Conditional expression (1) β5T/β5W = 1.052
Conditional expression (2) TLW/fW = 3.162
Conditional expression (3) TLT/fT = 0.658
Conditional expression (4) β2T/β2W = 3.246
Conditional expression (5) |f3/f2| = 1.550

As the data table in Table 1 shows, the variable magnification optical system according to Example 1 satisfies all the conditional expressions (1) to (5).

Figure 2B:
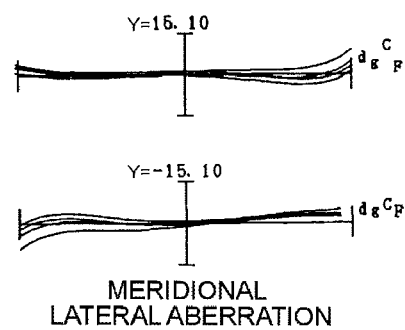
Figure 3:
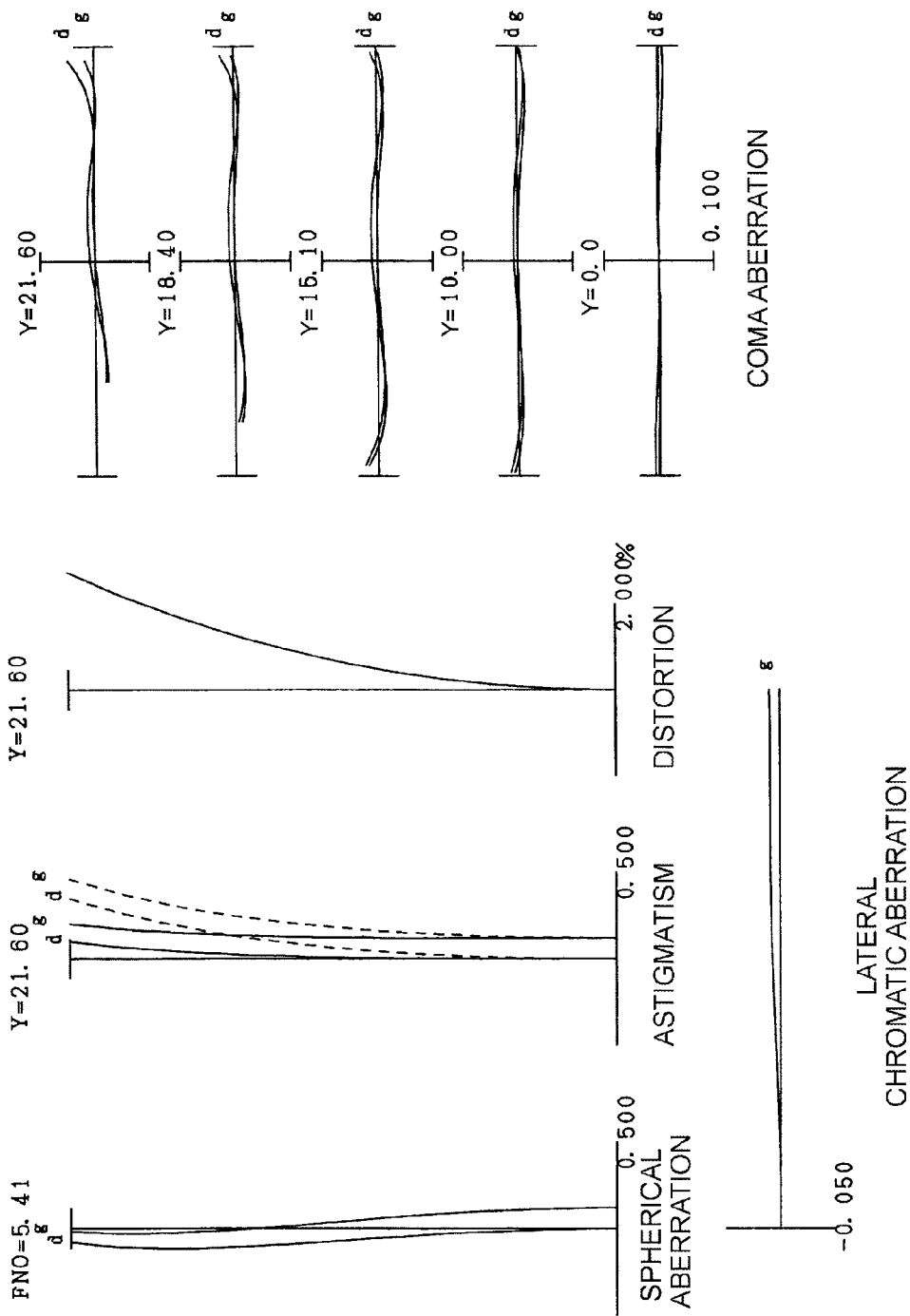
FIG. 3 are graphs showing various aberrations of the variable magnification optical system according to Example 1 upon focusing on infinity at the intermediate focal length state.
Figure 4A:
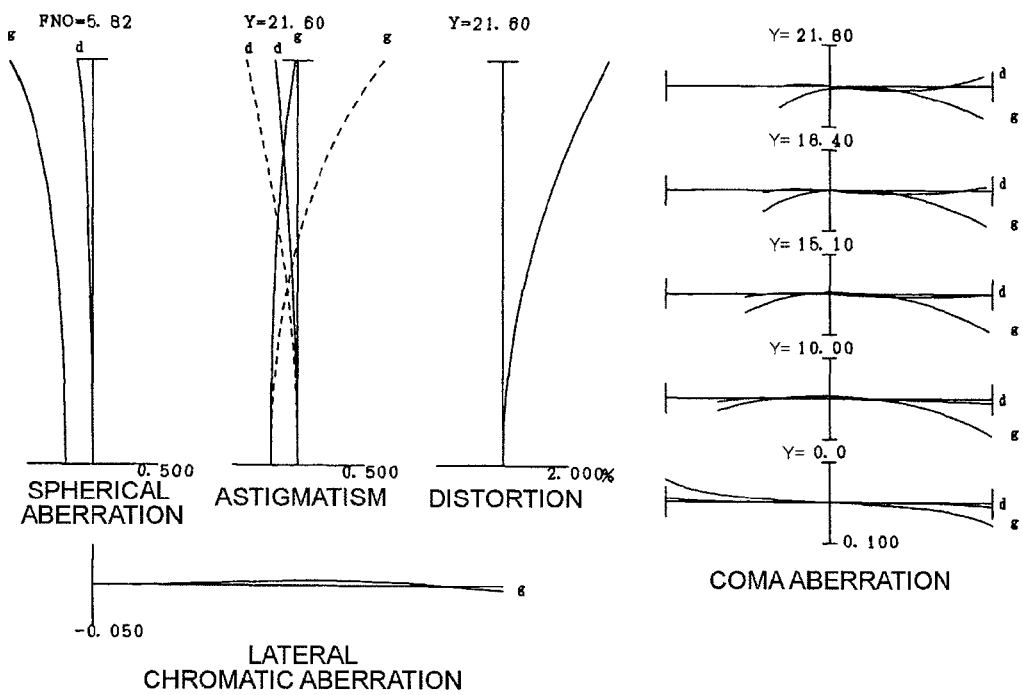
FIG. 4A and FIG. 4B are graphs showing various aberration of the variable magnification optical system according to Example 1 upon focusing on infinity at the telephoto end state, and graphs showing meridional lateral aberrations when blur correction is performed.
Figure 4B:
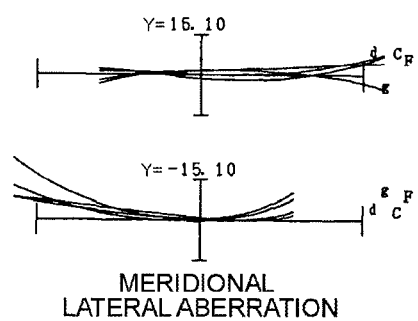
Figure 5A:
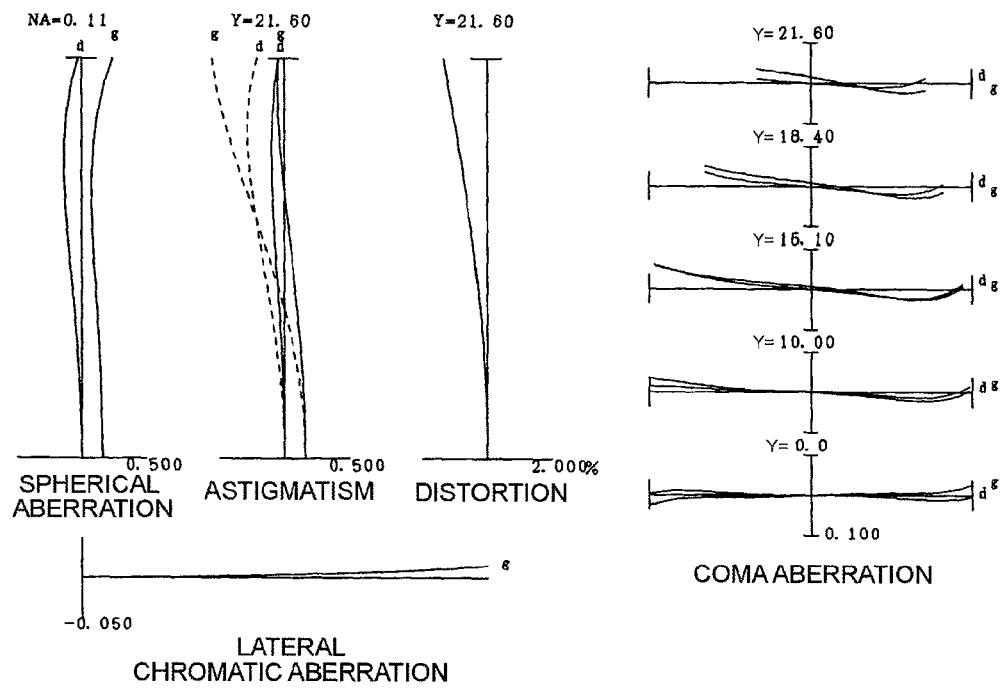
FIG. 5A and FIG. 5B are graphs showing various aberrations of the variable magnification optical system according to Example 1 upon focusing on short range at the wide-angle end state, and graphs showing meridional lateral aberrations when blur correction is performed.
Figure 5B:
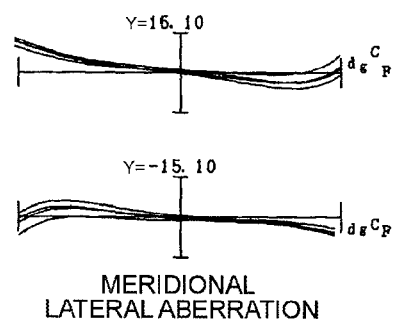
Figure 6:
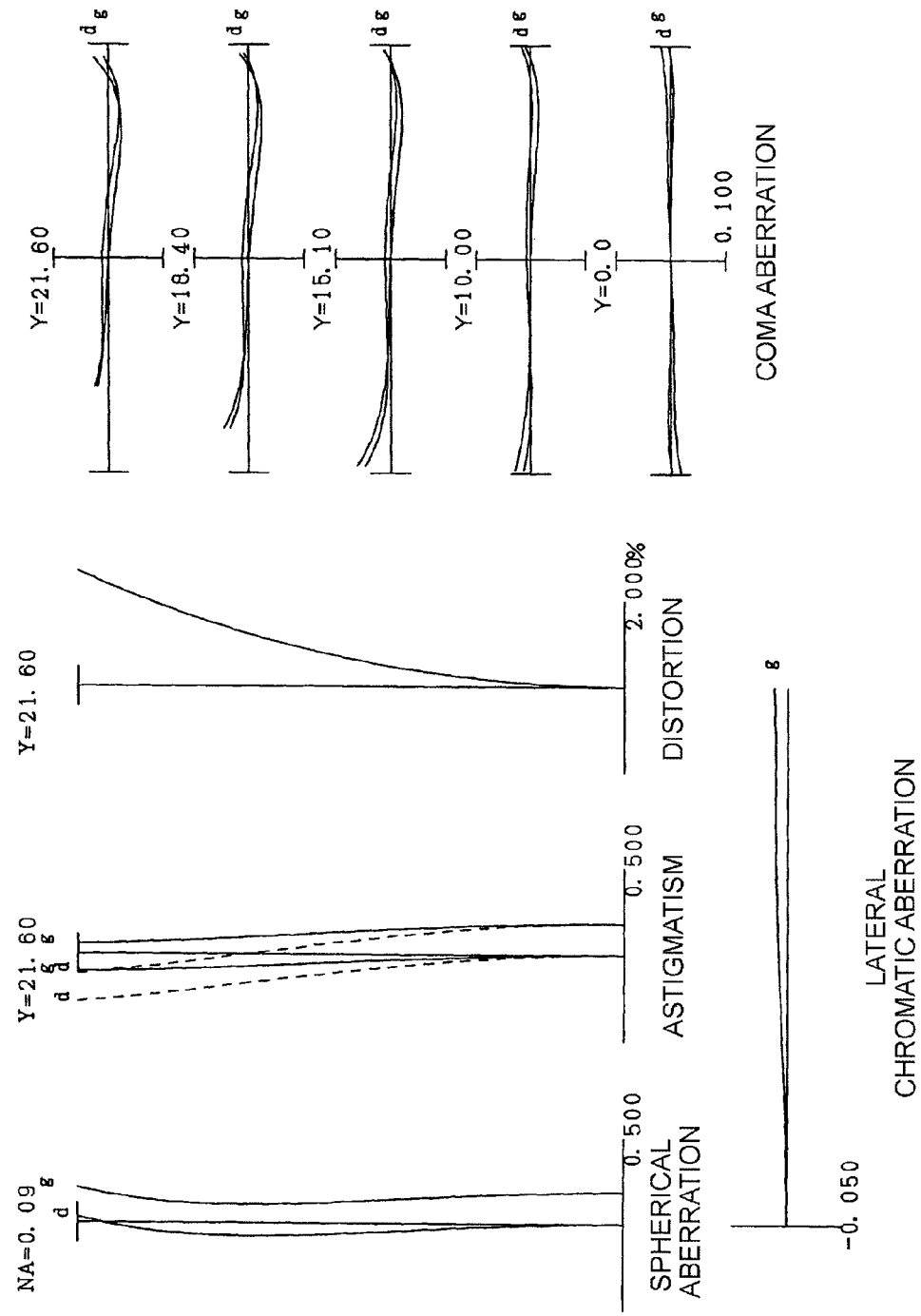
FIG. 6 are graphs showing various aberrations of the variable magnification optical system according to Example 1 upon focusing on short range at the intermediate focal length state.
Figure 7A:
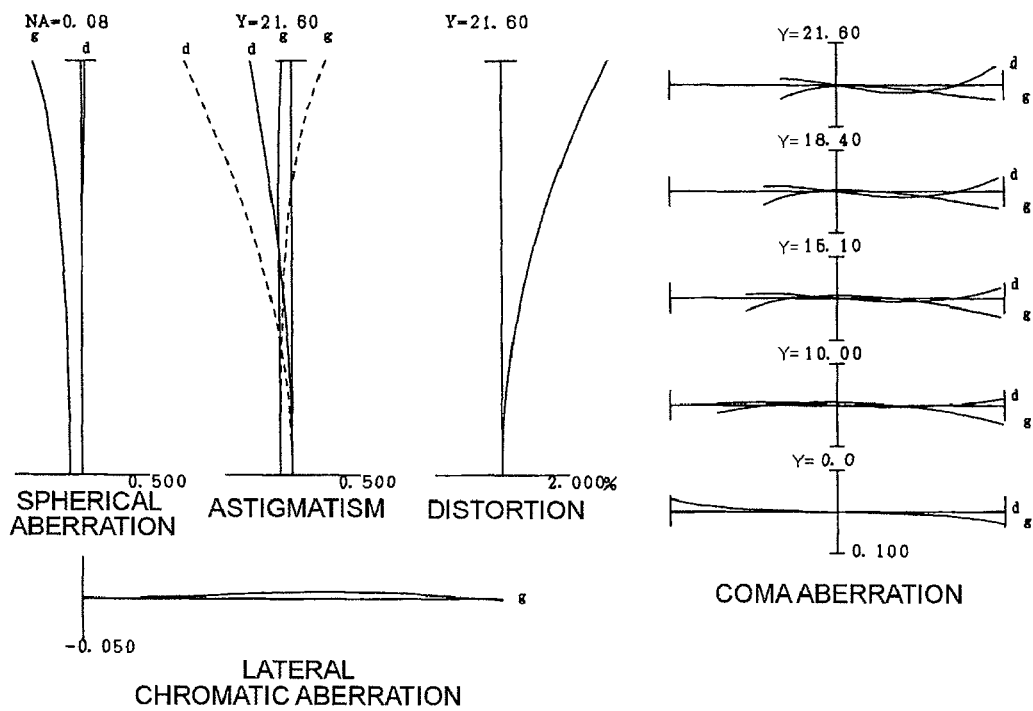
FIG. 7A and FIG. 7B are graphs showing various aberrations of the variable magnification optical system according to Example 1 upon focusing on short range at the telephoto end state, and graphs showing meridional lateral aberrations when blur correction is performed.
Figure 7B:
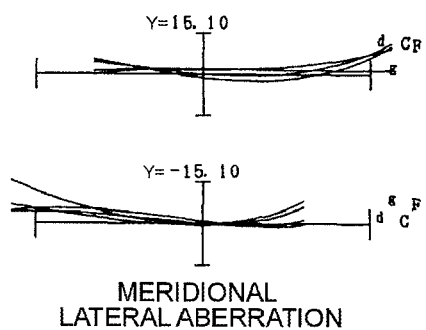

FIG. 2A and FIG. 2B are graphs showing various aberrations of the variable magnification optical system according to Example 1 upon focusing on infinity at the wide-angle end state, and graphs showing meridional lateral aberrations after blur correction is performed. FIG. 3 are graphs showing various aberrations of the variable magnification optical system according to Example 1 upon focusing on infinity at the intermediate focal length state. FIG. 4A and FIG. 4B are graphs showing various aberrations of the variable magnification optical system according to Example 1 upon focusing on infinity at the telephoto end state, and graphs showing meridional lateral aberrations after the blur correction is performed. FIG. 5A and FIG. 5B are graphs showing various aberrations of the variable magnification optical system according to Example 1 upon focusing on short range (lateral magnification of this optical system β=−0.033) at the wide-angle end state, and graphs showing meridional lateral aberrations after the blur correction is performed. FIG. 6 are graphs showing various aberrations of the variable magnification optical system according to Example 1 upon focusing on short range (lateral magnification of this optical system β=−0.033) at the intermediate focal length state. FIG. 7A and FIG. 7B are graphs showing various aberrations according to Example 1 upon focusing on short range (lateral magnification of this optical system β=−0.033) at the telephoto end state, and graphs showing the meridional lateral aberrations after blur correction is performed.

In each graph showing aberrations, FNO denotes an F number, and Y denotes an image height (unit: mm). In the graph showing spherical aberration, a value of the F number corresponding to the maximum aperture is shown, in the graph showing astigmatism and the graph showing distortion, a maximum value of the image height is shown respectively, and in the graph showing coma aberration, a value of each image height is shown respectively. d denotes various aberrations at the d-line (wavelength: 587.6 nm), g denotes various Aberrations at the g-line (wavelength: 435.8 nm), and no indication denotes various aberrations at the d-line. In the graph showing astigmatism, a solid line indicates a sagittal image surface, and a broken line indicates a meridional image surface. The description on the graphs showing aberrations is the same for all the other examples, and a redundant description will be omitted.

As each group showing aberrations clarifies, various Aberrations are corrected well in each focal length condition from the wide-angle end state to the telephoto end state, and excellent image forming performance is implemented in Example 1.

Example 2

Example 2 will now be described with reference to FIG. 8 to FIG. 14 and Table 2. FIG. 8 is a diagram depicting a configuration and zoom locus of the lens according to Example 2. As FIG. 8 shows, a variable magnification optical system according to Example 2 has, in order from an object, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power.

The first lens group G1 has, in order from the object, a cemented lens of a negative meniscus lens L11 having a convex surface facing the object and a biconvex positive lens L12, and a biconvex positive lens L13. The second lens group G2 has, in order from the object, a cemented lens of a biconvex positive lens L21 and a biconcave negative lens L22, a cemented lens of a biconcave negative lens L23 and a positive meniscus lens L24 having a convex surface facing the object, and a biconcave negative lens L25. The third lens group G3 has, in order from the object, a biconvex positive lens L31, and a cemented lens of a biconvex positive lens L32 and a biconcave negative lens L33. The fourth lens group G4 has, in order from the object, a negative meniscus lens L41 having a concave surface facing the object. The fifth lens group G5 has, in order from the object, a biconvex positive lens L51, and a cemented lens of a biconvex positive lens L52 and a negative meniscus lens L53 having a concave surface facing the object. The sixth lens group G6 has, in order from the object, a cemented lens of a positive meniscus lens L61 having a concave surface facing the object, and a biconcave negative lens L62.

In the variable magnification optical system according to this example having the above configuration, each lens group moves upon zooming from the wide-angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 increases once and then decreases. The first lens group G1 and the fourth lens group G4 are fixed with respect to the image plane I upon zooming from the wide-angle end state to the telephoto end state.

The aperture stop S is disposed between the fourth lens group G4 and the fifth lens group G5, and is fixed with respect to the image plane I upon zooming from the wide-angle end state to the telephoto end state.

In the variable magnification optical system according to this example, the image plane, when a blur is generated, is corrected by shifting the cemented lens of the lens L23 and the lens L24 in the second lens group G2 in a direction perpendicular to the optical axis. In order to correct the angle θ of rotation blur with a lens of which blur correction coefficient (ratio of moving distance of the image on the image plane to moving distance of the blur correction lens group in the optical axis direction) is K, when the focal length of this optical lens system is f, the blur correction lens group is moved by (f·tan θ)/K in a direction perpendicular to the optical axis. At the wide-angle end state of this example, the blur correction coefficient K is −0.890 and the focal length is 81.6 (mm), so the moving distance of the cemented lens of the lens L23 and the lens L24 for correcting the 0.350° of rotation blur is −0.560 (mm). At the wide-angle end state of this example, the blur correction coefficient K is −2.500 and the focal length is 392 (mm), so the moving distance of the cemented lens of the lens L23 and the lens L24 for correcting 0.160° of rotation blur is −0.437 (mm).

Table 2 shows the value of each data of the variable magnification optical system according to Example 2. The surface numbers 1 to 29 in Table 2 correspond to the surfaces 1 to 29 shown in FIG. 8.

TABLE 2

[General Data]

| | Wide-angle end state | | Intermediate focal length state | | Telephoto end state |
|---|---|---|---|---|---|
| f | 81.6 | ~ | 200 | ~ | 392 |
| FNO | 4.5 | ~ | 5.3 | ~ | 5.7 |
| TL | 253 | ~ | 253 | ~ | 253 |
| 2ω | 30.0 | ~ | 12.0 | ~ | 6.1 |

[Lens Data]

| Surface number | r | d | nd | νd |
|---|---|---|---|---|
| 1 | 171.3420 | 2.5 | 1.83400 | 37.2 |
| 2 | 72.5123 | 10.0 | 1.49782 | 82.6 |
| 3 | −1130.3971 | 0.2 | 1.00000 | |
| 4 | 76.7793 | 9.0 | 1.49782 | 82.6 |
| 5 | −564.6225 | D5 | 1.00000 | |
| 6 | 150.6303 | 4.8 | 1.78472 | 25.7 |
| 7 | −72.8111 | 1.8 | 1.80440 | 39.6 |
| 8 | 148.0147 | 4.0 | 1.00000 | |
| 9 | −185.3431 | 1.7 | 1.64000 | 60.1 |
| 10 | 35.8292 | 3.5 | 1.72825 | 28.5 |
| 11 | 58.6915 | 5.2 | 1.00000 | |
| 12 | −92.7368 | 2.0 | 1.79500 | 45.3 |
| 13 | 259.1229 | D13 | 1.00000 | |
| 14 | 68.1244 | 5.5 | 1.51680 | 64.1 |
| 15 | −84.3298 | 0.2 | 1.00000 | |
| 16 | 58.5569 | 6.0 | 1.51680 | 64.1 |
| 17 | −152.0505 | 2.0 | 1.80518 | 25.4 |
| 18 | 182.6148 | D18 | 1.00000 | |
| 19 | −68.4161 | 2.0 | 1.48749 | 70.5 |
| 20 | −135.8811 | 2.0 | 1.00000 | |
| 21 | 0.0000 | D21 | 1.00000 | (Aperture stop S) |
| 22 | 130.6828 | 4.0 | 1.48749 | 70.5 |
| 23 | −102.4704 | 0.1 | 1.00000 | |
| 24 | 49.4879 | 6.0 | 1.48749 | 70.5 |
| 25 | −42.8452 | 1.2 | 1.83400 | 37.2 |
| 26 | −274.1828 | D26 | 1.00000 | |
| 27 | −886.3949 | 3.7 | 1.80518 | 25.4 |
| 28 | −27.4569 | 1.1 | 1.79500 | 45.3 |
| 29 | 41.0844 | BF | 1.00000 | |

TABLE 2-continued

[Variable Distance Data]

| | Infinity | | | Short range | | |
|---|---|---|---|---|---|---|
| | Wide angle end | Intermediate | Telephoto end | Wide angle end | Intermediate | Telephoto end |
| f | 81.6 | 200 | 392 | — | — | — |
| β | 0 | 0 | 0 | −0.0333 | −0.0333 | −0.0333 |
| D0 | 0 | 0 | 0 | 2353.99 | 5834.28 | 11543.44 |
| D5 | 5.06 | 33.52 | 48.02 | 5.06 | 33.52 | 48.02 |
| D13 | 68.13 | 30.12 | 2.00 | 68.13 | 30.12 | 2.00 |
| D18 | 4.01 | 13.56 | 27.18 | 4.01 | 13.56 | 27.18 |
| D21 | 33.56 | 19.09 | 14.38 | 32.83 | 17.74 | 12.08 |
| D26 | 8.64 | 9.93 | 2.00 | 9.37 | 11.27 | 4.30 |
| BF | 55.13 | 68.31 | 80.94 | 55.13 | 68.31 | 80.94 |

[Each Group Focal Length Data]

| Group Number | First surface of group | Focal length of group | Variable magnification ratio |
|---|---|---|---|
| G1 | 1 | 125.57 | — |
| G2 | 6 | −38.39 | 3.29 |
| G3 | 14 | 60.09 | 1.18 |
| G4 | 19 | −285.44 | 0.93 |
| G5 | 22 | 73.85 | 1.07 |
| G6 | 27 | −50.18 | 1.24 |

[Conditional Expression Correspondence Value]

Conditional expression (1) β5T/β5W = 1.066
Conditional expression (2) TLW/fW = 3.100
Conditional expression (3) TLT/fT = 0.645
Conditional expression (4) β2T/β2W = 3.288
Conditional expression (5) |f3/f2| = 1.565

As the data table in Table 2 shows, the variable magnification optical system according to Example 2 satisfies all the conditional expressions (1) to (5).

Figure 9A:
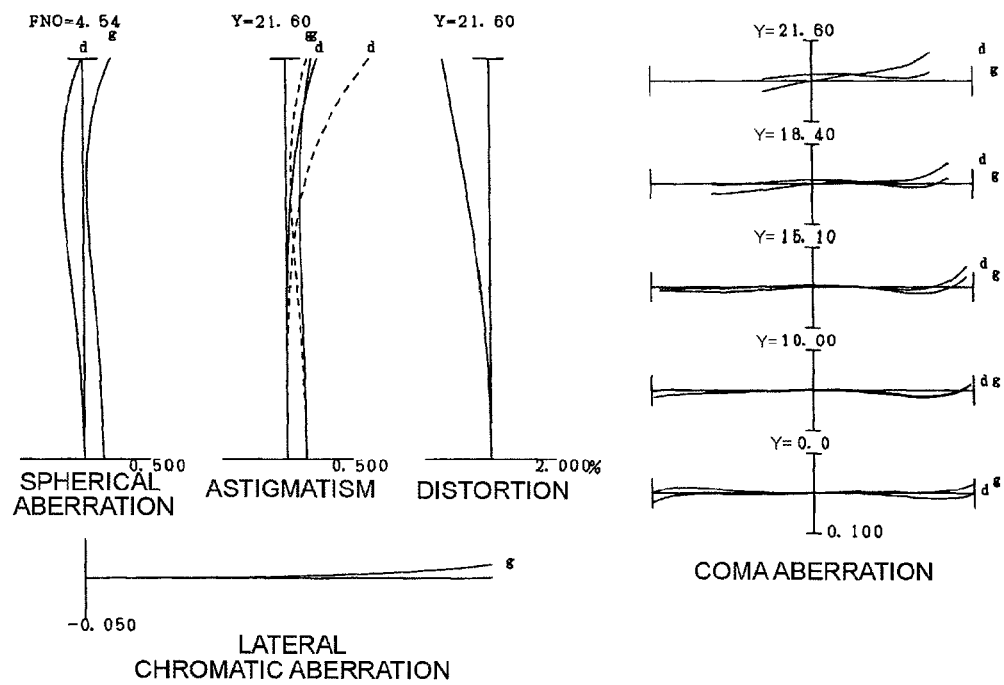
FIG. 9A and FIG. 9B are graphs showing various aberrations of the variable magnification optical system according to Example 2 upon focusing on infinity at the wide-angle end state, and graphs showing meridional lateral aberrations when blur correction is performed.
Figure 9B:
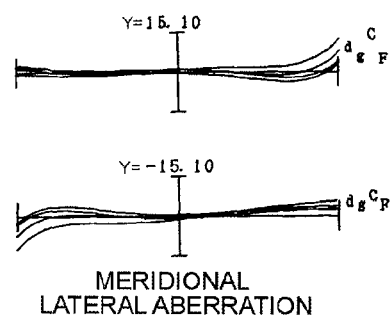
Figure 10:
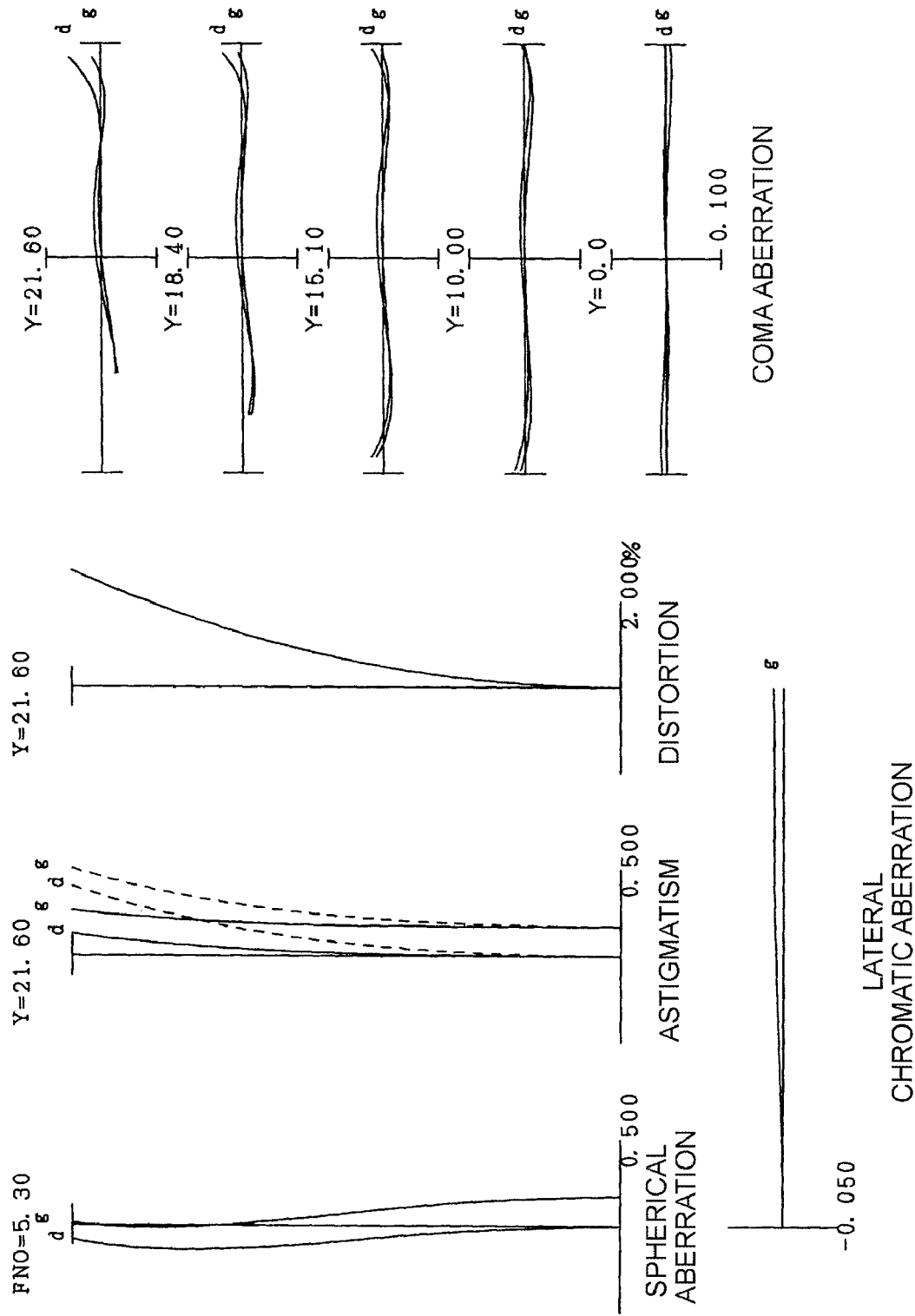
FIG. 10 are graphs showing various aberrations of the variable magnification optical system according to Example 2 upon focusing on infinity at the intermediate focal length state.
Figure 11A:
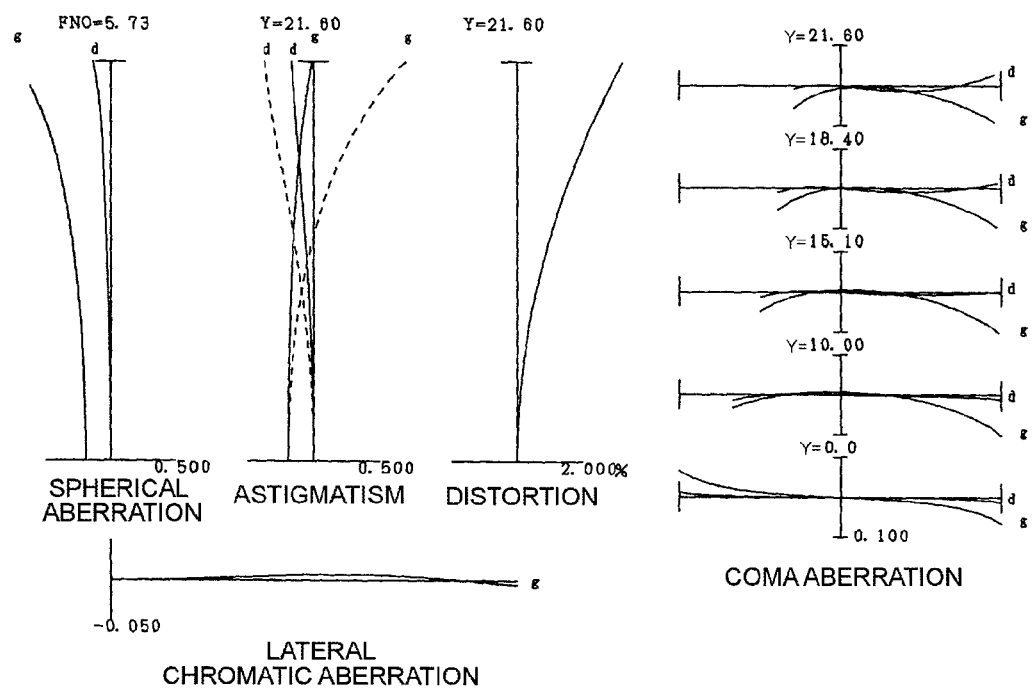
FIG. 11A and FIG. 11B are graphs showing various Aberration of the variable magnification optical system according to Example 2 upon focusing on infinity at the telephoto end state, and graphs showing meridional lateral aberrations when blur correction is performed.
Figure 11B:
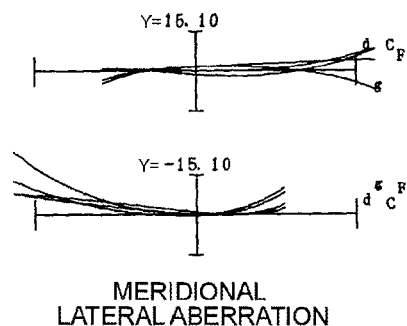
Figure 13:
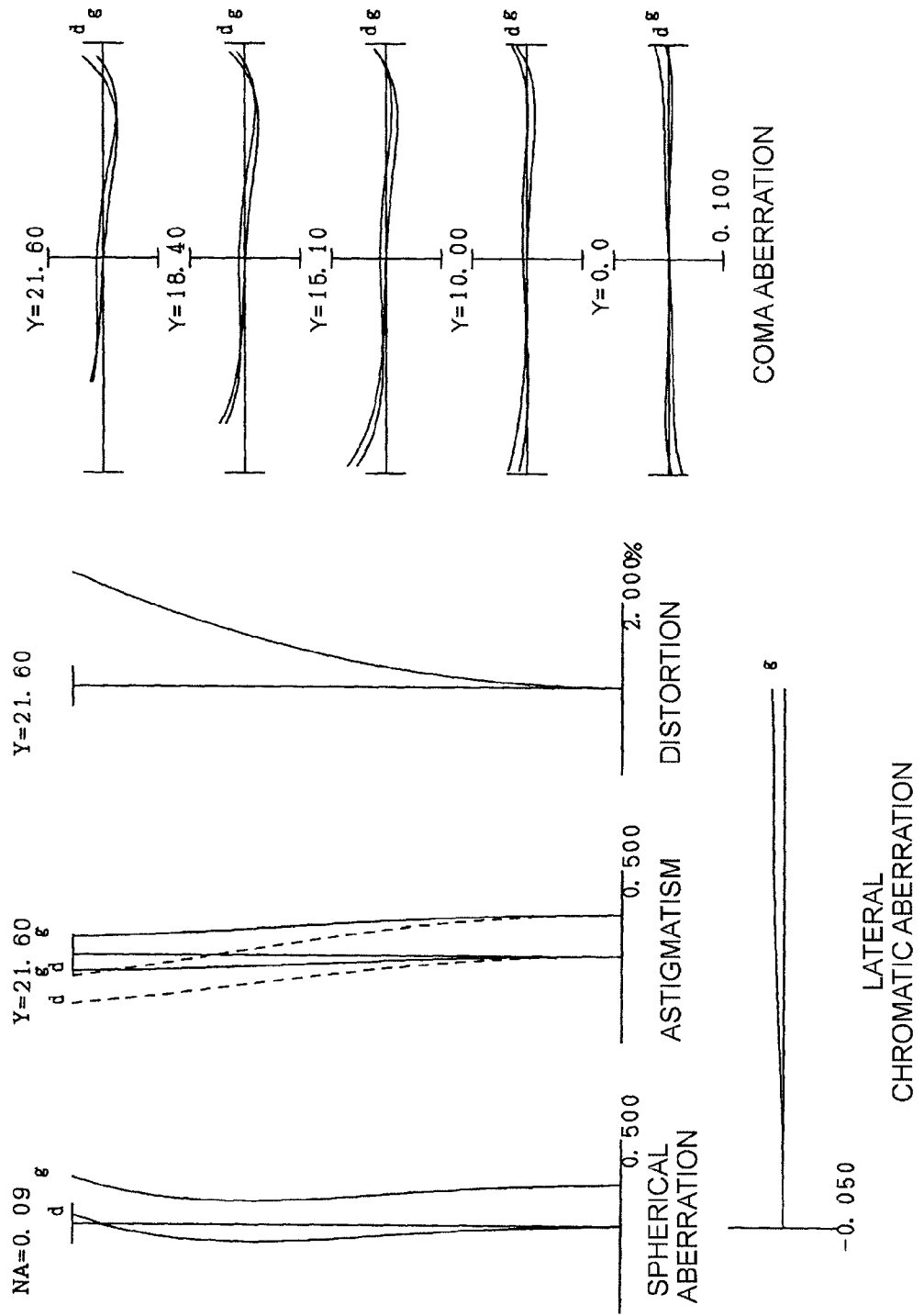
FIG. 13 are graphs showing various aberrations of the variable magnification optical system according to Example 2 upon focusing on short range at the intermediate focal length state.
Figure 14A:
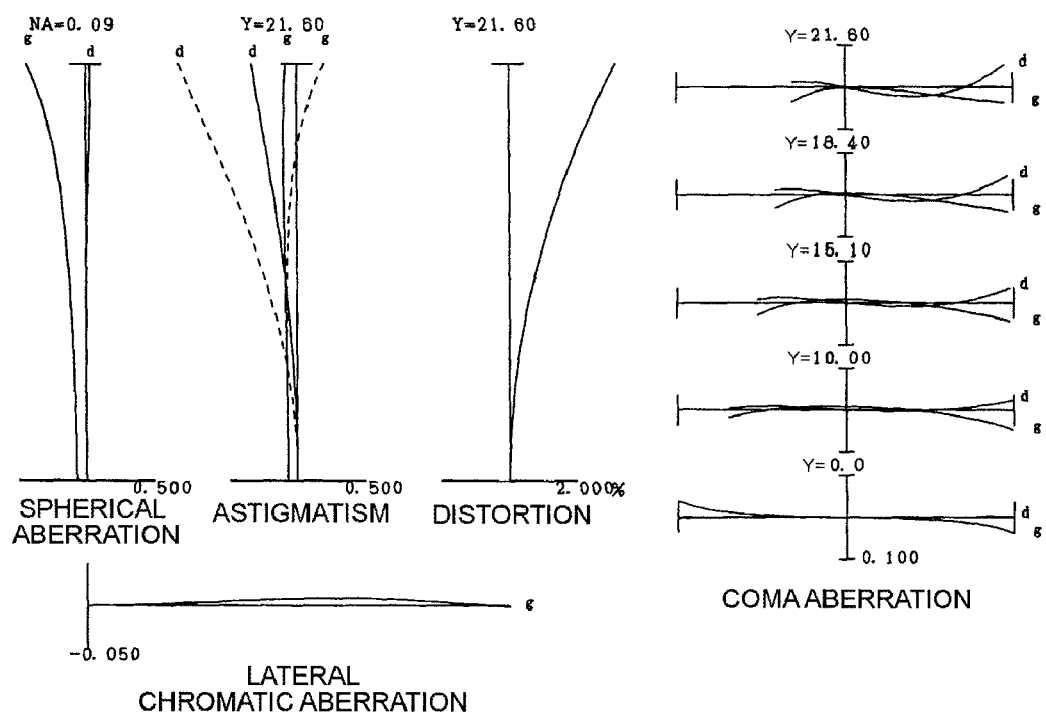
FIG. 14A and FIG. 14B are graphs showing various aberrations of the variable magnification optical system according to Example 2 upon focusing on short range at the telephoto end state, and graphs showing meridional lateral aberrations when blur correction is performed.
Figure 14B:
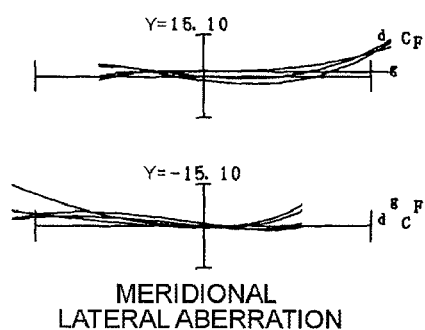

FIG. 9A and FIG. 9B are graphs showing various aberrations of the variable magnification optical system according to Example 2 upon focusing on infinity at the wide-angle end state, and graphs showing meridional lateral aberrations after blur correction is performed. FIG. 10 are graphs showing various aberrations of the variable magnification optical system according to Example 2 upon focusing on infinity at the intermediate focal length state. FIG. 11A and FIG. 11B are graphs showing various aberrations of the variable magnification optical system according to Example 2 upon focusing on infinity at the telephoto end state, and graphs showing meridional lateral aberrations after the blur correction is performed. FIG. 12A and FIG. 12B are graphs showing various aberrations of the variable magnification optical system according to Example 2 upon focusing on short range (lateral magnification of this optical system β=−0.033) at the wide-angle end state, and graphs showing meridional lateral aberrations after the blur correction is performed. FIG. 13 are graphs showing various aberrations of the variable magnification optical system according to Example 2 upon focusing on short range (lateral magnification of this optical system β=−0.033) at the intermediate focal length state. FIG. 14A and FIG. 14B are graphs showing various aberrations according to Example 2 upon focusing on short range (lateral magnification of this optical system β=−0.033) at the telephoto end state, and graphs showing the meridional lateral aberrations after blur correction is performed.

As each group showing aberrations clarifies, various aberrations are corrected well in each focal length condition from the wide-angle end state to the telephoto end state, and excellent image forming performance is implemented in Example 2.

Example 3

Example 3 will now be described with reference to FIG. 15 to FIG. 21 and Table 3. FIG. 15 is a diagram depicting a configuration and zoom locus of the lens according to Example 3. As FIG. 15 shows, a variable magnification optical system according to Example 3 has, in order from an object, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power.

The first lens group G1 has, in order from the object, a cemented lens of a negative meniscus lens L11 having a convex surface facing the object and a biconvex positive lens L12, and a biconvex positive lens L13. The second lens group G2 has, in order from the object, a cemented lens of a biconcave negative lens L21 and a biconvex positive lens L22, and a cemented lens of a positive meniscus lens L23 having a concave surface facing the object and a biconcave negative lens L24, and a biconcave negative lens L25. The third lens group G3 has, in order from the object, a biconvex positive lens L31, and a cemented lens of a biconvex positive lens L32 and a negative meniscus lens L33 having a concave surface facing the object. The fourth lens group G4 has, in order from the object, a negative meniscus lens L41 having a concave surface facing the object. The fifth lens group G5 has, in order from the object, a cemented lens of a biconvex positive lens L51 and a negative meniscus lens L52 having a concave surface facing the object, and a positive meniscus lens L53 having a convex surface facing the object. The sixth lens group G6 has, in order from the object, a biconvex positive lens L61 and a biconcave negative lens L62.

In the variable magnification optical system according to this example having the above configuration, each lens group moves upon zooming from the wide-angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 increases once and then decreases. The first lens group G1 and the fourth lens group G4 are fixed with respect to the image plane I upon zooming from the wide-angle end state to the telephoto end state.

The aperture stop S is disposed between the fourth lens group G4 and the fifth lens group G5, and is fixed with respect to the image plane I upon zooming from the wide-angle end state to the telephoto end state.

In the variable magnification optical system according to this example, the image plane, when a blur is generated, is corrected by shifting the cemented lens of the lens L23 and the lens L24 in the second lens group G2 in a direction perpendicular to the optical axis. In order to correct the angle θ of rotation blur with a lens of which blur correction coefficient (ratio of moving distance of the image on the image plane to moving distance of the blur correction lens group in the optical axis direction) is K, when the focal length of this optical lens system is f, the blur correction lens group is moved by (f·tan θ)/K in a direction perpendicular to the optical axis. At the wide-angle end state of this example, the blur correction coefficient K is −0.800 and the focal length is 81.6 (mm), so the moving distance of the cemented lens of the lens L23 and the lens L24 for correcting the 0.350° of rotation blur is −0.623 (mm). At the wide-angle end state of this example, the blur correction coefficient K is −2.100 and the focal length is 392 (mom), so the moving distance of the cemented lens of the lens L23 and the lens L24 for correcting 0.160° of rotation blur is −0.520 (mm).

Table 3 shows the value of each data of the variable magnification optical system according to Example 3. The surface numbers 1 to 29 in Table 3 correspond to the surfaces 1 to 29 shown in FIG. 15.

TABLE 3

[General Data]

|   | Wide-angle end state | | Intermediate focal length state | | Telephoto end state |
| --- | --- | --- | --- | --- | --- |
| f | 81.6 | ~ | 200 | ~ | 392 |
| FNO | 4.6 | ~ | 5.4 | ~ | 5.8 |
| TL | 258 | ~ | 258 | ~ | 258 |
| 2ω | 29.9 | ~ | 12.0 | ~ | 6.1 |

[Lens Data]

| Surface number | r | d | nd | νd |
| --- | --- | --- | --- | --- |
| 1 | 171.6481 | 2.5 | 1.80100 | 35.0 |
| 2 | 76.0506 | 10.0 | 1.49782 | 82.6 |
| 3 | −1159.1033 | 0.2 | 1.00000 | |
| 4 | 75.7456 | 9.4 | 1.49782 | 82.6 |
| 5 | −4872.1548 | D5 | 1.00000 | |
| 6 | −328.7250 | 1.8 | 1.77250 | 49.6 |
| 7 | 73.4374 | 6.1 | 1.78472 | 25.7 |
| 8 | −147.7219 | 2.5 | 1.00000 | |
| 9 | −443.0291 | 3.0 | 1.72825 | 28.5 |
| 10 | −136.4061 | 1.7 | 1.62299 | 58.2 |
| 11 | 58.1952 | 6.7 | 1.00000 | |
| 12 | −51.5189 | 2.0 | 1.77250 | 49.6 |
| 13 | 241.1192 | D13 | 1.00000 | |
| 14 | 68.8807 | 6.0 | 1.60311 | 60.7 |
| 15 | −72.6635 | 0.2 | 1.00000 | |
| 16 | 99.8244 | 5.5 | 1.51680 | 64.1 |
| 17 | −79.1490 | 2.0 | 1.84666 | 23.8 |
| 18 | −829.9328 | D18 | 1.00000 | |
| 19 | −55.7432 | 2.0 | 1.48749 | 70.5 |
| 20 | −144.4046 | 2.0 | 1.00000 | |
| 21 | 0.0000 | D21 | 1.00000 | (Aperture stop S) |
| 22 | 109.9360 | 6.0 | 1.48749 | 70.5 |
| 23 | −33.4380 | 1.2 | 1.83400 | 37.2 |
| 24 | −70.6173 | 0.1 | 1.00000 | |
| 25 | 52.7594 | 4.0 | 1.48749 | 70.5 |
| 26 | 403.4790 | D26 | 1.00000 | |
| 27 | 255.8792 | 3.7 | 1.75520 | 27.5 |
| 28 | −35.1477 | 1.1 | 1.77250 | 49.6 |
| 29 | 37.3687 | BF | 1.00000 | |

[Variable Distance Data]

| | Infinity | | | Short range | | |
| --- | --- | --- | --- | --- | --- | --- |
| | Wide angle end | Intermediate | Telephoto end | Wide angle end | Intermediate | Telephoto end |
| f | 81.6 | 200 | 392 | — | — | — |
| β | 0 | 0 | 0 | −0.0333 | −0.0333 | −0.0333 |
| D0 | 0 | 0 | 0 | 2356.68 | 5834.35 | 11543.50 |
| D5 | 2.55 | 34.06 | 52.41 | 2.55 | 34.06 | 52.41 |
| D13 | 63.17 | 25.94 | 2.00 | 63.17 | 25.94 | 2.00 |
| D18 | 3.80 | 9.51 | 15.10 | 3.80 | 9.51 | 15.10 |
| D21 | 44.06 | 24.44 | 18.61 | 43.28 | 23.08 | 16.31 |
| D26 | 5.18 | 10.39 | 2.00 | 5.96 | 11.75 | 4.30 |
| BF | 59.54 | 73.95 | 88.18 | 59.54 | 73.95 | 88.18 |

TABLE 3-continued

[Each Group Focal Length Data]

| Group Number | First surface of group | Focal length of group | Variable magnification ratio |
| --- | --- | --- | --- |
| G1 | 1 | 129.47 | — |
| G2 | 6 | −36.21 | 3.65 |
| G3 | 14 | 52.72 | 1.18 |
| G4 | 19 | −187.63 | 0.96 |
| G5 | 22 | 72.14 | 0.93 |
| G6 | 27 | −55.40 | 1.25 |

[Conditional Expression Correspondence Value]

Conditional expression (1) β5T/β5W = 0.930
Conditional expression (2) TLW/fW = 3.162
Conditional expression (3) TLT/fT = 0.658
Conditional expression (4) β2T/β2W = 3.647
Conditional expression (5) |f3/f2| = 1.456

As the data table in Table 3 shows, the variable magnification optical system according to Example 3 satisfies all the conditional expressions (1) to (5).

Figure 16A:
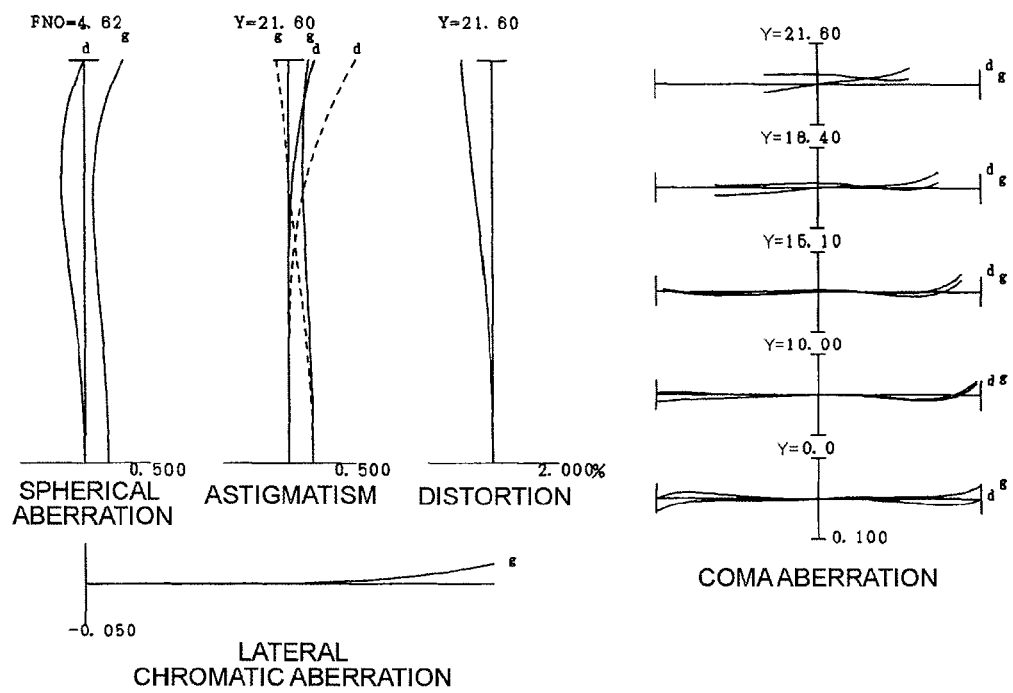
FIG. 16A and FIG. 16B are graphs showing various aberrations of the variable magnification optical system according to Example 3 upon focusing on infinity at the wide-angle end state, and graphs showing meridional lateral aberrations when blur correction is performed.
Figure 16B:
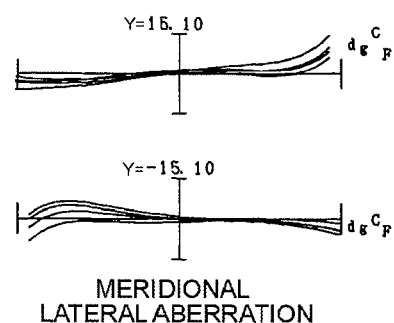
Figure 17:
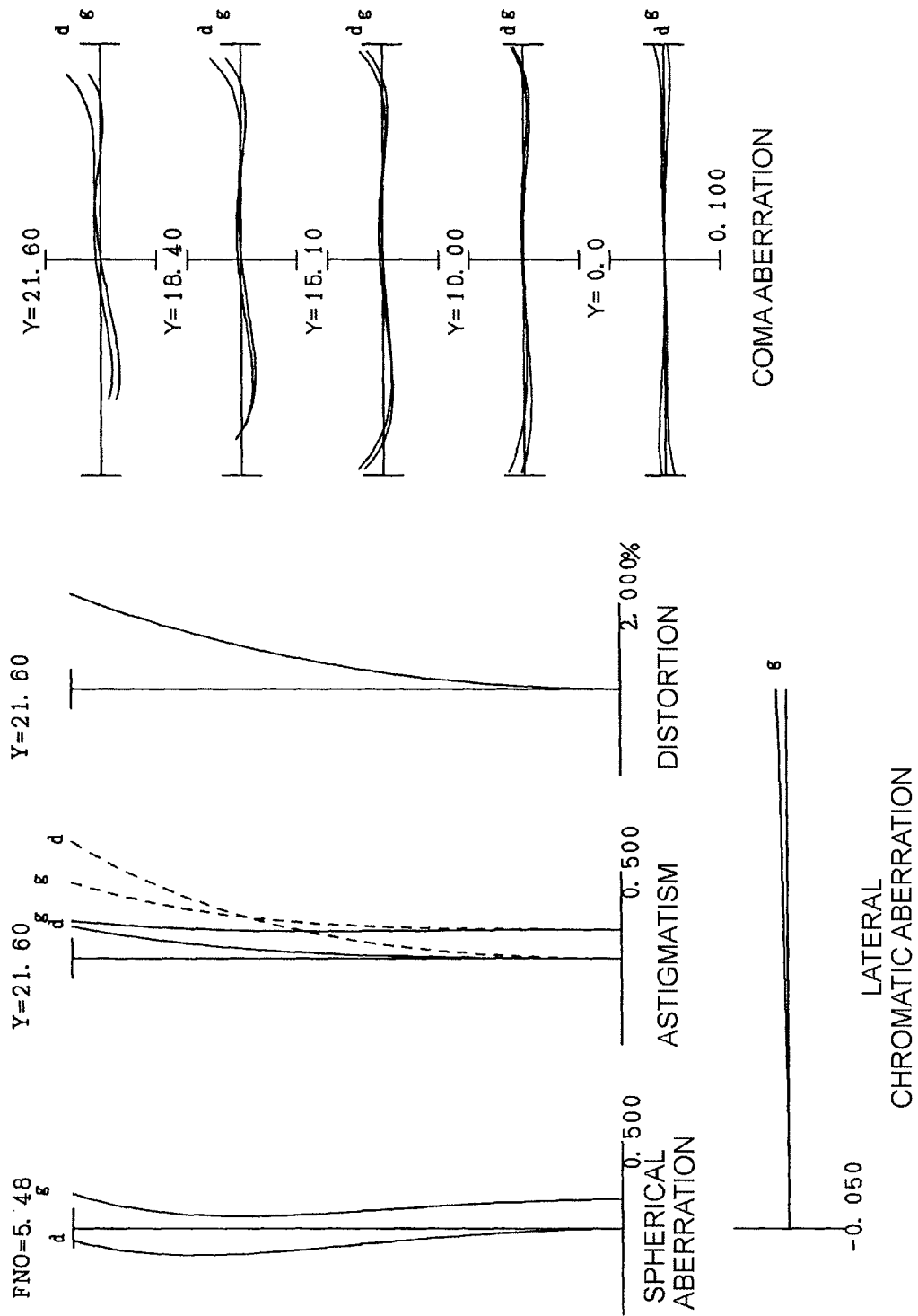
FIG. 17 are graphs showing various aberrations of the variable magnification optical system according to Example 3 upon focusing on infinity at the intermediate focal length state.
Figure 18A:
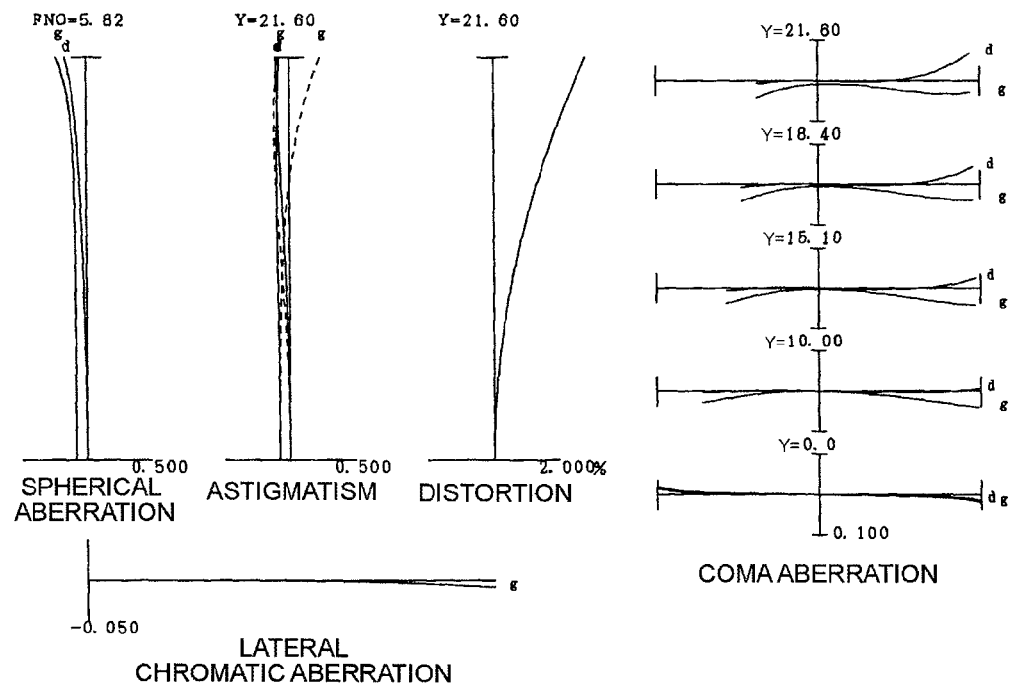
FIG. 18A and FIG. 18B are graphs showing various aberration of the variable magnification optical system according to Example 3 upon focusing on infinity at the telephoto end state, and graphs showing meridional lateral aberrations when blur correction is performed.
Figure 18B:
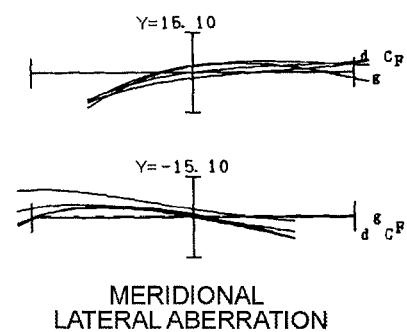
Figure 19A:
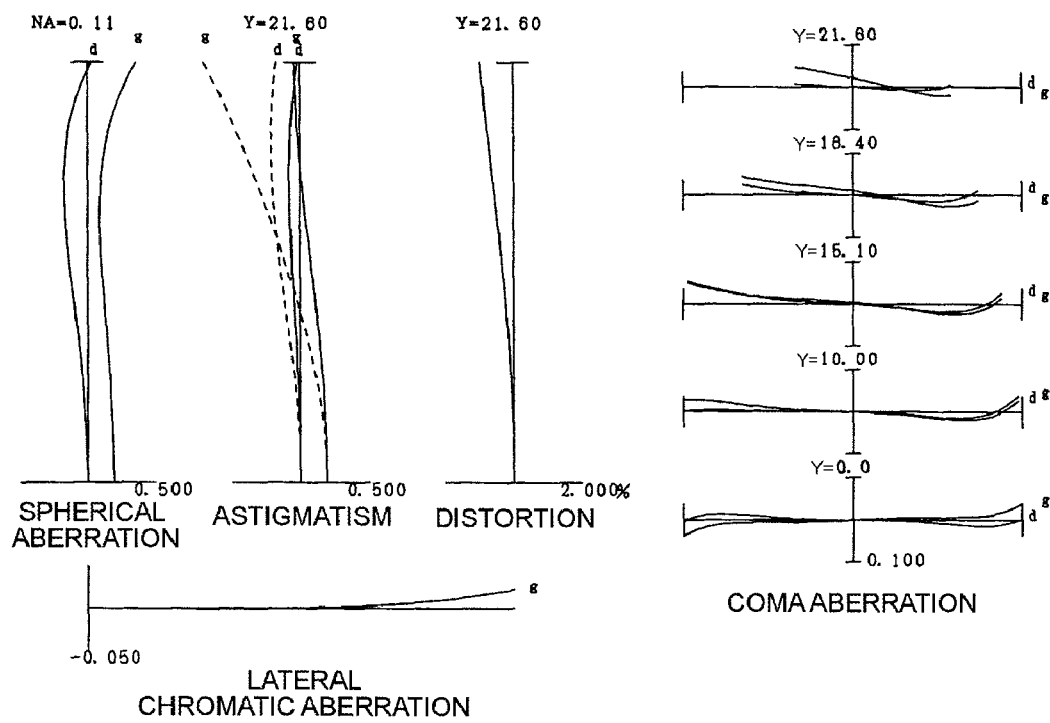
FIG. 19A and FIG. 19B are graphs showing various aberrations of the variable magnification optical system according to Example 3 upon focusing on short range at the wide-angle end state, and graphs showing meridional lateral aberrations when blur correction is performed.
Figure 19B:
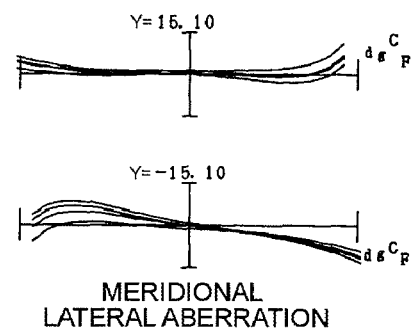
Figure 20:
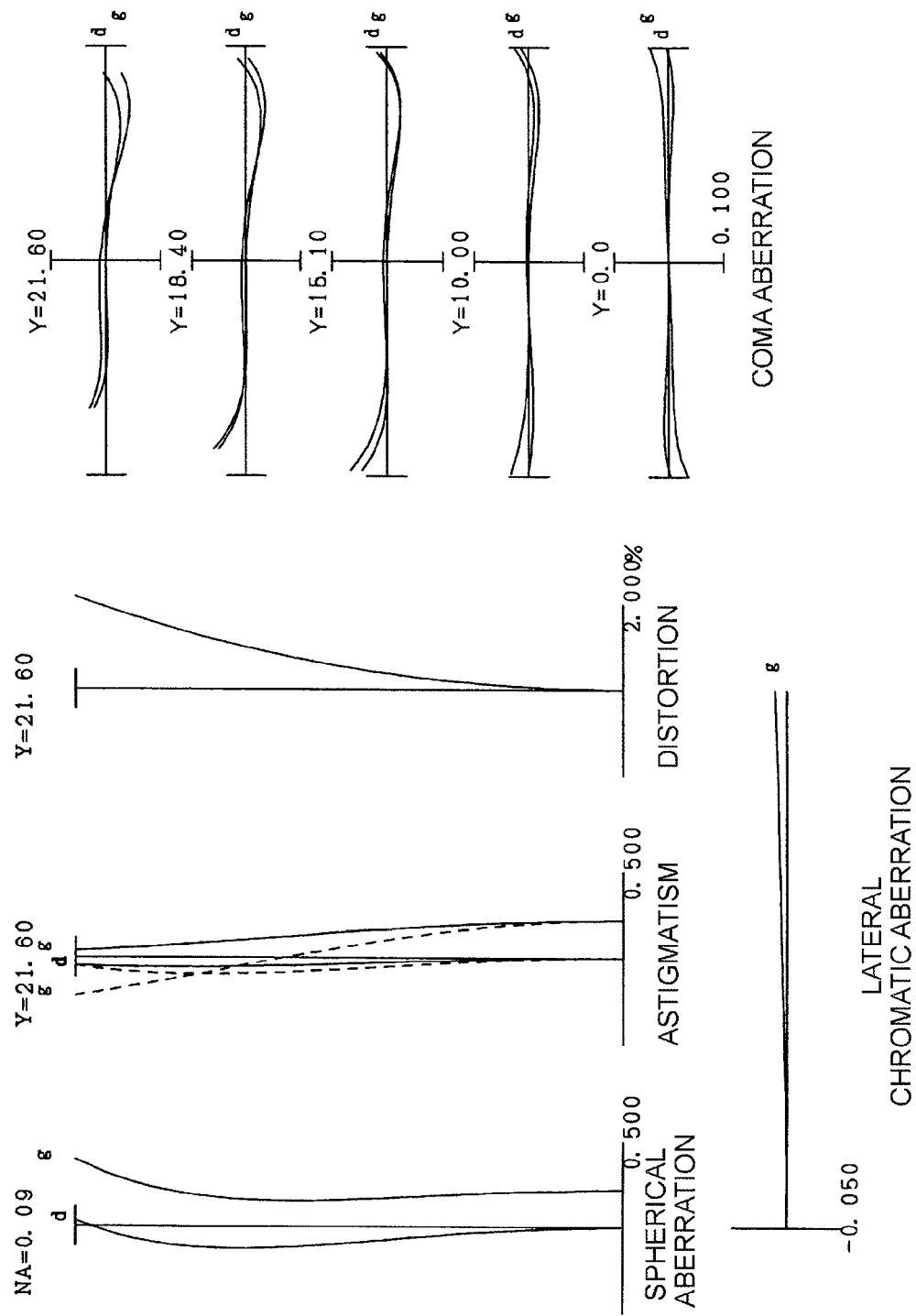
FIG. 20 are graphs showing various aberrations of the variable magnification optical system according to Example 3 upon focusing on short range at the intermediate focal length state.
Figure 21A:
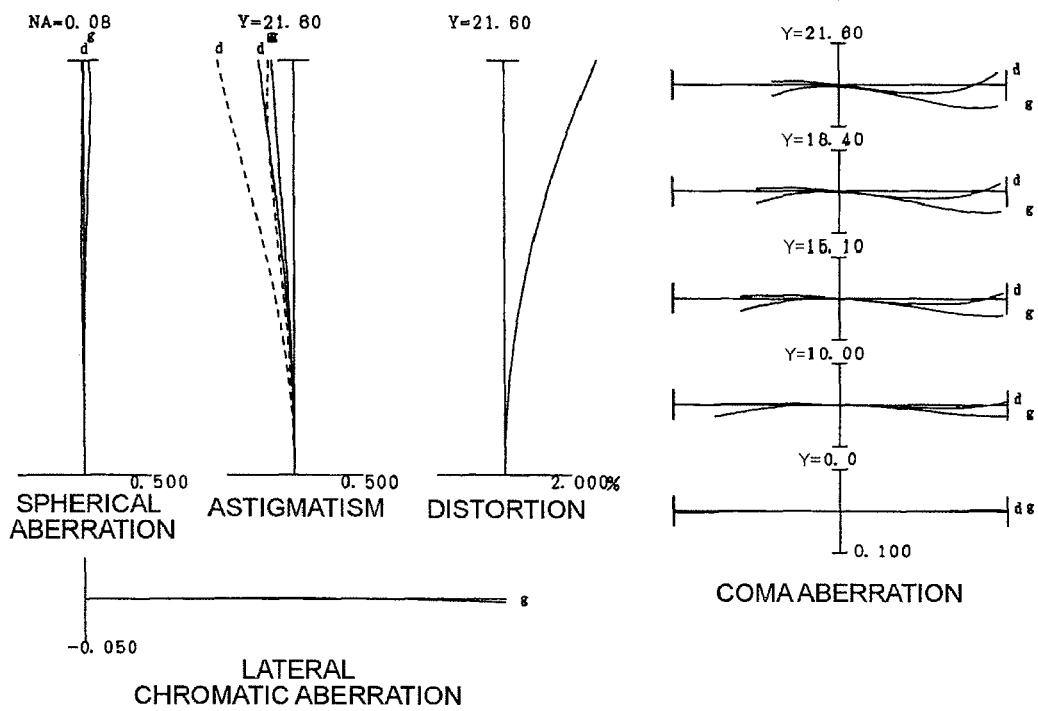
FIG. 21A and FIG. 21B are graphs showing various aberrations of the variable magnification optical system according to Example 3 upon focusing on short range at the telephoto end state, and graphs showing meridional lateral aberrations when blur correction is performed.
Figure 21B:
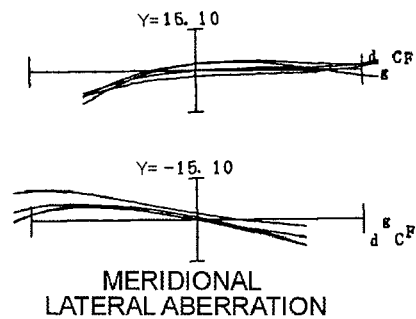

FIG. 16A and FIG. 16B are graphs showing various aberrations of the variable magnification optical system according to Example 3 upon focusing on infinity at the wide-angle end state, and graphs showing meridional lateral aberrations after blur correction is performed. FIG. 17 are graphs showing various aberrations of the variable magnification optical system according to Example 3 upon focusing on infinity at the intermediate focal length state. FIG. 18A and FIG. 18B are graphs showing various aberrations of the variable magnification optical system according to Example 3 upon focusing on infinity at the telephoto end state, and graphs showing meridional lateral aberrations after the blur correction is performed. FIG. 19A and FIG. 19B are graphs showing various aberrations of the variable magnification optical system according to Example 3 upon focusing on short range (lateral magnification of this optical system β=−0.033) at the wide-angle end state, and graphs showing meridional lateral aberrations after the blur correction is performed. FIG. 20 are graphs showing various aberrations of the variable magnification optical system according to Example 3 upon focusing on short range (lateral magnification of this optical system β=−0.033) at the intermediate focal length state. FIG. 21A and FIG. 21B are graphs showing various aberrations according to Example 3 upon focusing on short range (lateral magnification of this optical system β=−0.033) at the telephoto end state, and graphs showing the meridional lateral aberrations after blur correction is performed.

As each group showing aberrations clarifies, various Aberrations are corrected well in each focal length condition from the wide-angle end state to the telephoto end state, and excellent image forming performance is implemented in Example 3.

Example 4

Figure 22:
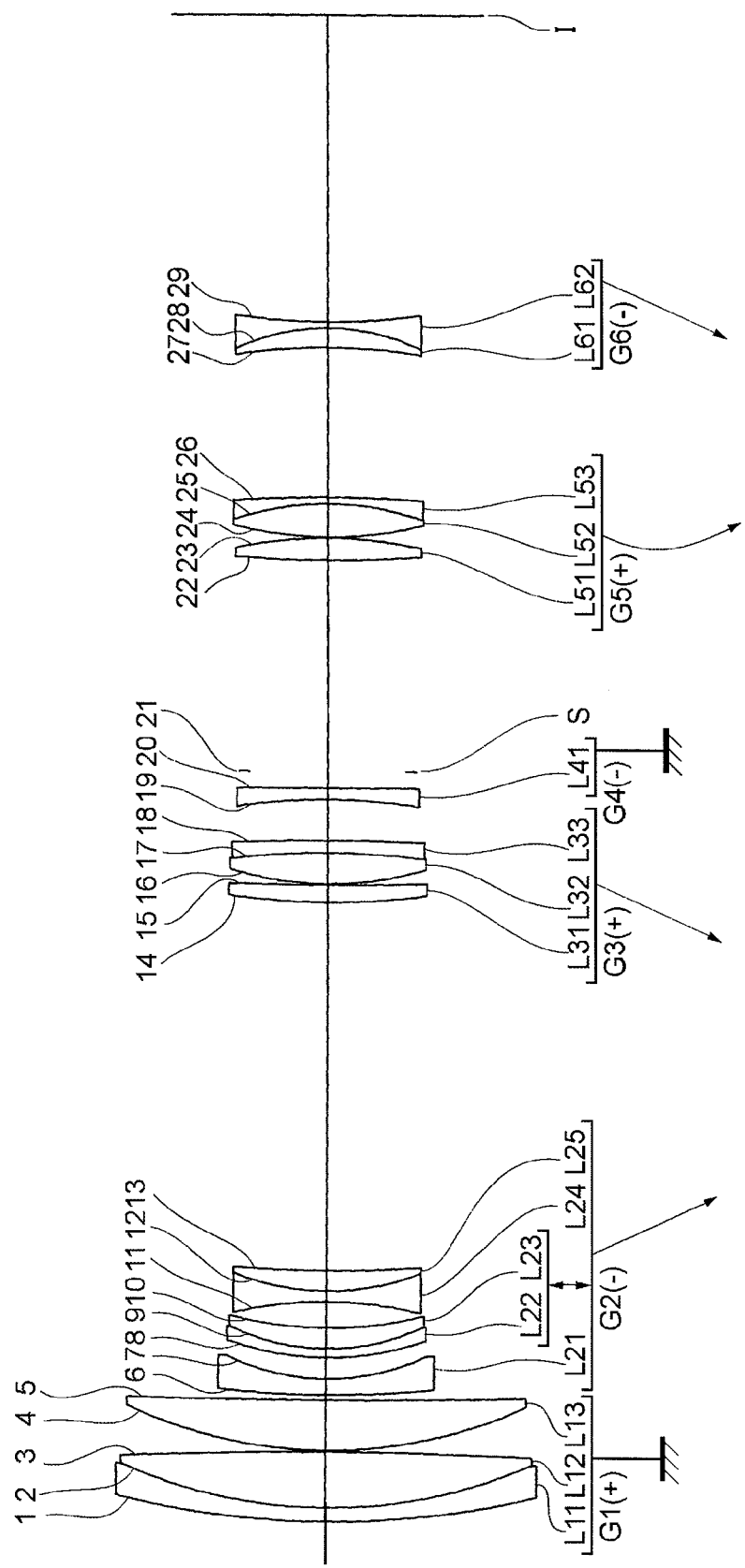
FIG. 22 is a diagram depicting a configuration and zoom locus of the variable magnification optical system according to Example 4.

Example 4 will now be described with reference to FIG. 22 to FIG. 28 and Table 4. FIG. 22 is a diagram depicting a configuration and zoom locus of the lens according to Example 4. As FIG. 22 shows, a variable magnification optical system according to Example 4 has, in order from an object, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power.

The first lens group G1 has, in order from the object, a cemented lens of a negative meniscus lens L11 having a convex surface facing the object and a biconvex positive lens L12, and a positive meniscus lens L13 having a convex surface facing the object. The second lens group G2 has, in order from the object, a negative meniscus lens L21 having a convex surface facing the object, a cemented lens of a negative meniscus lens L22 having a convex surface facing the object and a positive meniscus lens L23 having a convex surface facing the object, a biconcave negative lens L24, and a positive meniscus lens L25 having a convex surface facing the object. The third lens group G3 has, in order from the object, a positive meniscus lens L31 having a convex surface facing the object, and a cemented lens of a biconvex positive lens L32 and a negative meniscus lens L33 having a concave surface facing the object. The fourth lens group G4 has, in order from the object, a biconcave negative lens L41. The fifth lens group G5 has, in order from the object, a biconvex positive lens L51, and a cemented lens of a biconvex positive lens L52 and a negative meniscus lens L53 having a concave surface facing the object. The sixth lens group G6 has, in order from the object, a cemented lens of a positive meniscus lens L61 having a concave surface facing the object and a biconcave negative lens L62.

In the variable magnification optical system according to this example having the above configuration, each lens group moves upon zooming from the wide-angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases once and then increases, and the distance between the fifth lens group G5 and the sixth lens group G6 decreases. The first lens group G1 and the fourth lens group G4 are fixed with respect to the image plane I upon zooming from the wide-angle end state to the telephoto end state.

The aperture stop S is disposed between the fourth lens group G4 and the fifth lens group G5, and is fixed with respect to the image plane I upon zooming from the wide-angle end state to the telephoto end state.

In the variable magnification optical system according to this example, the image plane, when a blur is generated, is corrected by shifting the cemented lens of the lens L22 and the lens L23 in the second lens group G2 in a direction perpendicular to the optical axis. In order to correct the angle θ of rotation blur with a lens of which blur correction coefficient (ratio of moving distance of the image on the image plane to moving distance of the blur correction lens group in the optical axis direction) is K, when the focal length of this optical lens system is f, the blur correction lens group is moved by (f·tan θ)/K in a direction perpendicular to the optical axis. At the wide-angle end state of this example, the blur correction coefficient K is 0.341 and the focal length is 81.6 (mm), so the moving distance of the cemented lens of the lens L22 and the lens L23 for correcting the 0.350° of rotation blur is 1.462 (mm). At the wide-angle end state of this example, the blur correction coefficient K is 0.911 and the focal length is 392 (mm), so the moving distance of the cemented lens of the lens L22 and the lens L23 for correcting 0.160° of rotation blur is 1.198 (nm).

Table 4 shows the value of each data of the variable magnification optical system according to Example 4. The surface numbers 1 to 29 in Table 4 correspond to the surfaces 1 to 29 shown in FIG. 22.

TABLE 4

[General Data]

| | Wide-angle end state | | Intermediate focal length state | | Telephoto end state |
|---|---|---|---|---|---|
| f | 81.5 | ~ | 200 | ~ | 392 |
| FNO | 4.7 | ~ | 5.6 | ~ | 5.8 |
| TL | 270 | ~ | 270 | ~ | 270 |
| 2ω | 30.1 | ~ | 12.2 | ~ | 6.1 |

[Lens Data]

| Surface number | r | d | nd | νd |
|---|---|---|---|---|
| 1 | 149.7243 | 2.5 | 1.79504 | |
| 2 | 87.6167 | 10 | 1.49782 | |
| 3 | −766.3399 | 0.2 | 1.00000 | |
| 4 | 80.4609 | 9 | 1.49782 | |
| 5 | 1010.7373 | D5 | 1.00000 | |
| 6 | 171.2447 | 2.8 | 1.79952 | |
| 7 | 39.8614 | 3.8 | 1.00000 | |
| 8 | 51.8170 | 1.6 | 1.67790 | |
| 9 | 39.4650 | 3.7 | 1.79504 | |
| 10 | 67.3033 | 4.7 | 1.00000 | |
| 11 | −69.4371 | 1.9 | 1.69680 | |
| 12 | 44.2653 | 3.6 | 1.78470 | |
| 13 | 222.7146 | D13 | 1.00000 | |
| 14 | 119.9680 | 3.1 | 1.77250 | |
| 15 | 639.3796 | 0.2 | 1.00000 | |
| 16 | 58.2905 | 5.6 | 1.49782 | |
| 17 | −128.5450 | 2.2 | 1.80809 | |
| 18 | −422.5145 | D18 | 1.00000 | |
| 19 | −103.3774 | 2 | 1.48749 | |
| 20 | 2465.6583 | 3 | 1.00000 | |
| 21 | 0.0000 | D21 | 1.00000 | (Aperture stop S) |
| 22 | 209.8911 | 4 | 1.48749 | |
| 23 | −75.5934 | 0.1 | 1.00000 | |
| 24 | 63.1794 | 6 | 1.48749 | |
| 25 | −50.5413 | 1.2 | 1.83400 | |
| 26 | −240.6249 | D26 | 1.00000 | |
| 27 | −103.5005 | 3.5 | 1.80518 | |
| 28 | −37.2320 | 1.1 | 1.79500 | |
| 29 | 116.4975 | BF | 1.00000 | |

[Variable Distance Data]

| | Infinity | | | Short range | | |
|---|---|---|---|---|---|---|
| | Wide angle end | Intermediate | Telephoto end | Wide angle end | Intermediate | Telephoto end |
| f | 81.5 | 200 | 392 | — | — | — |
| β | 0 | 0 | 0 | −0.0333 | −0.0333 | −0.0333 |
| D0 | 0 | 0 | 0 | 2371.78 | 5861.79 | 11356.81 |
| D5 | 1.00 | 32.52 | 51.64 | 1.00 | 32.52 | 51.64 |
| D13 | 65.91 | 26.19 | 1.03 | 65.91 | 26.19 | 1.03 |
| D18 | 7.37 | 15.57 | 21.61 | 7.37 | 15.57 | 21.61 |
| D21 | 38.09 | 29.93 | 44.81 | 37.25 | 28.16 | 41.27 |
| D26 | 26.83 | 25.29 | 1.61 | 27.67 | 27.05 | 5.14 |
| BF | 55.00 | 64.70 | 73.50 | 55.00 | 64.70 | 73.50 |

[Each Group Focal Length Data]

| Group Number | First surface of group | Focal length of group | Variable magnification ratio |
|---|---|---|---|
| G1 | 1 | 122.24 | — |
| G2 | 6 | −42.26 | 5.65 |
| G3 | 14 | 75.85 | 0.50 |
| G4 | 19 | −203.48 | 0.51 |
| G5 | 22 | 75.60 | 2.93 |
| G6 | 27 | −69.15 | 1.15 |

TABLE 4-continued

[Conditional Expression Correspondence Value]

Conditional expression (1) β5T/β5W = 2.932
Conditional expression (2) TLW/fW = 3.312
Conditional expression (3) TLT/fT = 0.689
Conditional expression (4) β2T/β2W = 5.646
Conditional expression (5) |f3/f2| = 1.795

As the data table in Table 4 shows, the variable magnification optical system according to Example 4 satisfies all the conditional expressions (1) to (5).

Figure 24:
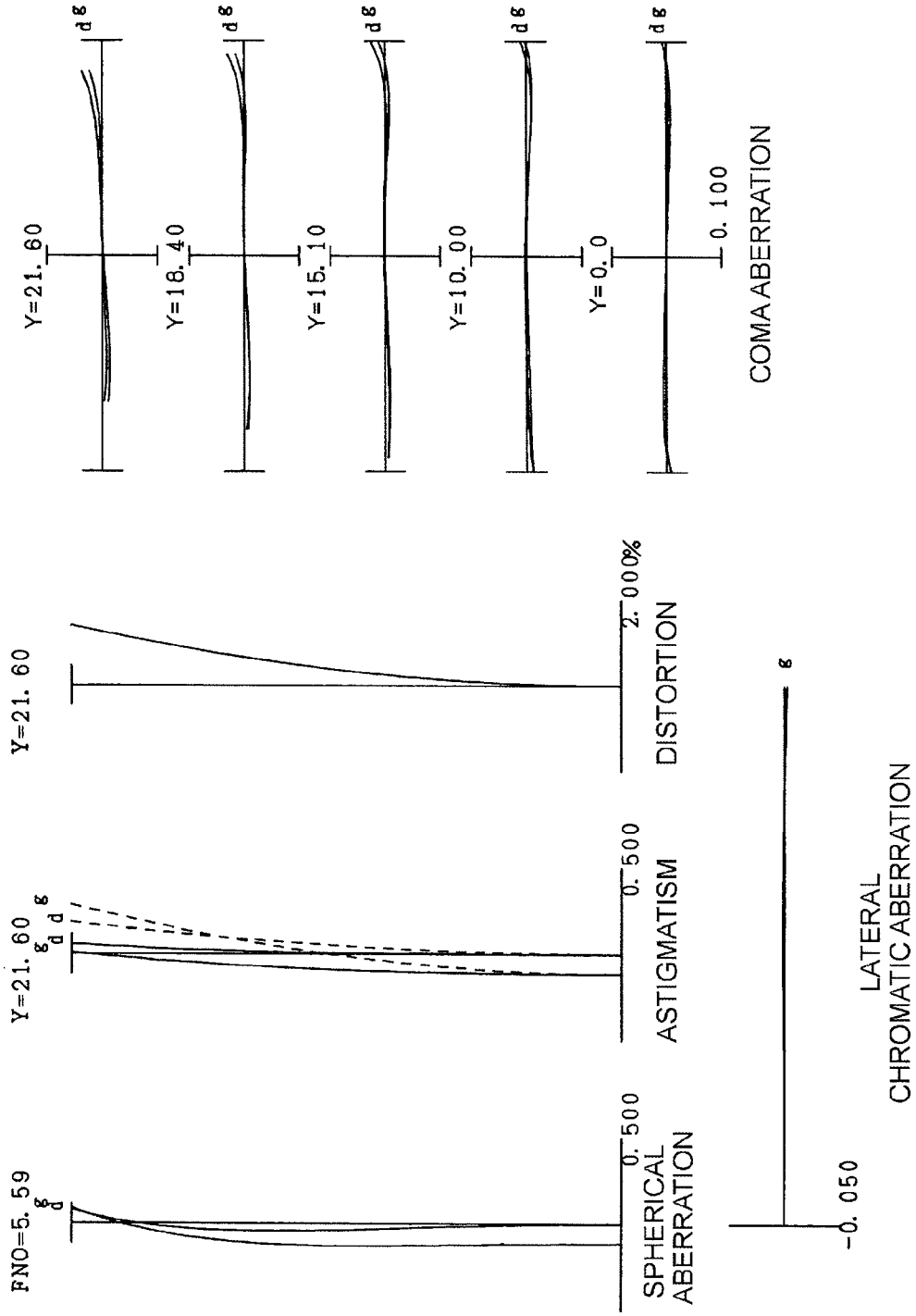
FIG. 24 are graphs showing various aberrations of the variable magnification optical system according to Example 4 upon focusing on infinity at the intermediate focal length state.
Figure 25A:
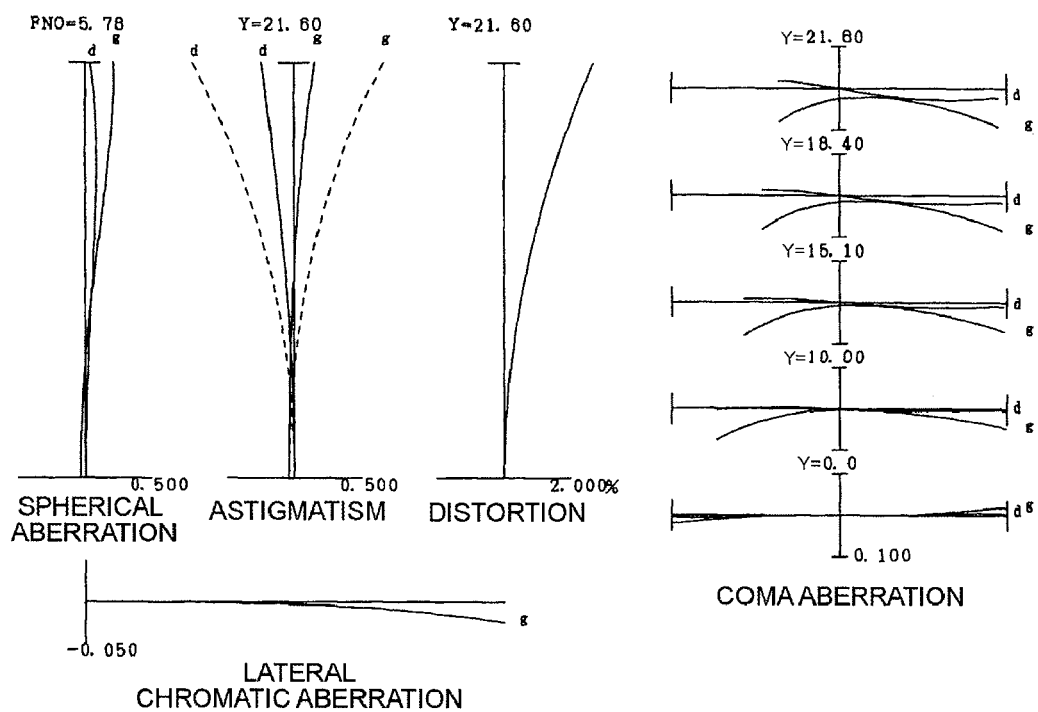
FIG. 25A and FIG. 25B are graphs showing various aberration of the variable magnification optical system according to Example 4 upon focusing on infinity at the telephoto end state, and graphs showing meridional lateral aberrations when blur correction is performed.
Figure 25B:
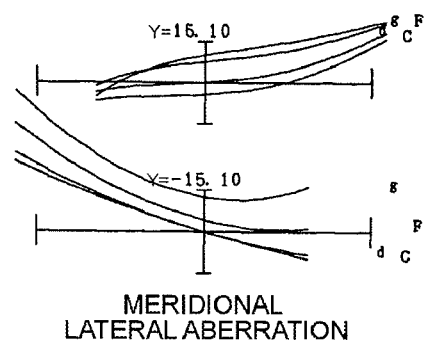
Figure 26A:
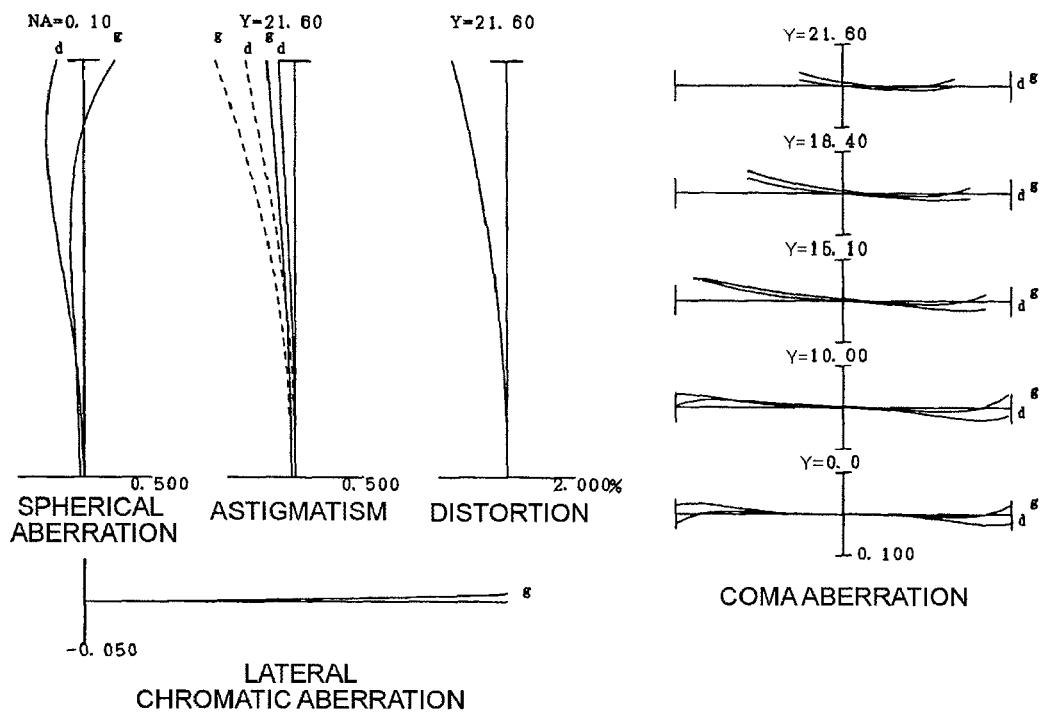
FIG. 26A and FIG. 26B are graphs showing various Aberrations of the variable magnification optical system according to Example 4 upon focusing on short range at the wide-angle end state, and graphs showing meridional lateral aberrations when blur correction is performed.
Figure 26B:
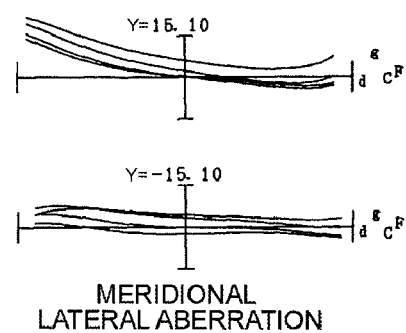
Figure 27:
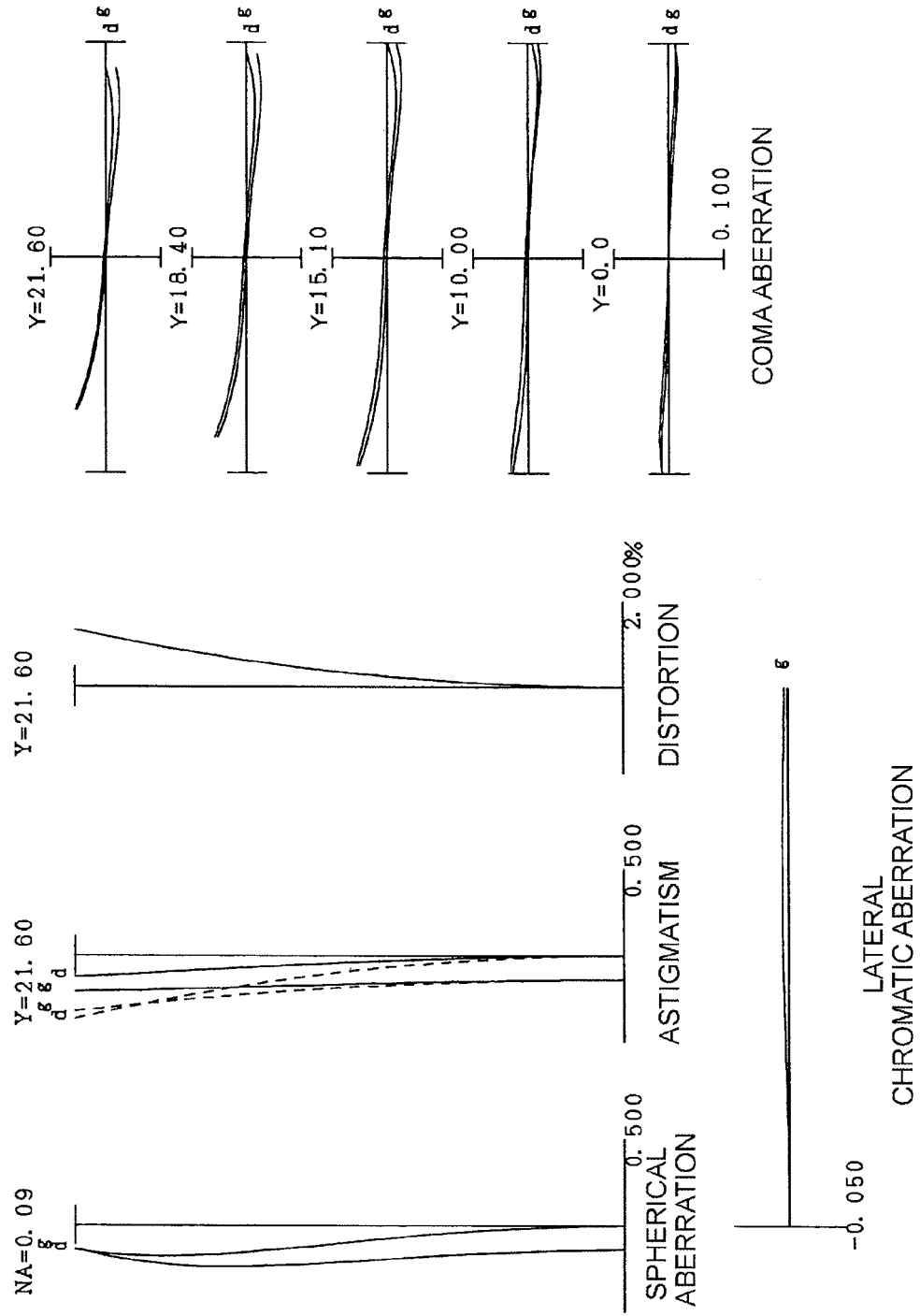
FIG. 27 are graphs showing various aberrations of the variable magnification optical system according to Example 4 upon focusing on short range at the intermediate focal length state.
Figure 28A:
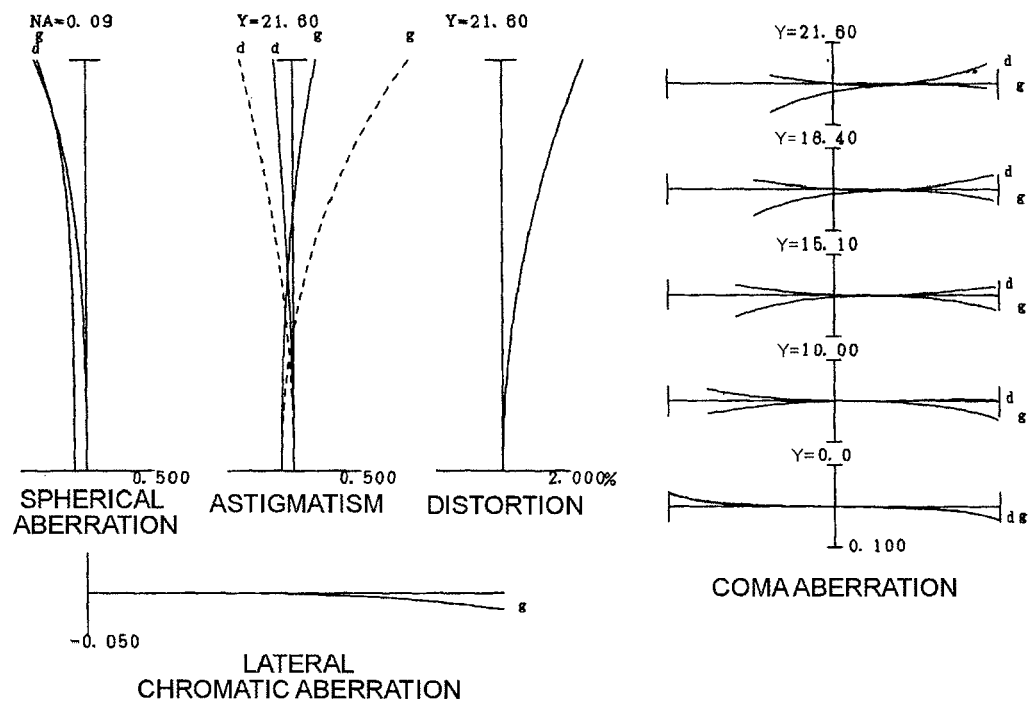
FIG. 28A and FIG. 28B are graphs showing various Aberrations of the variable magnification optical system according to Example 4 upon focusing on short range at the telephoto end state, and graphs showing meridional lateral aberrations when blur correction is performed.
Figure 28B:
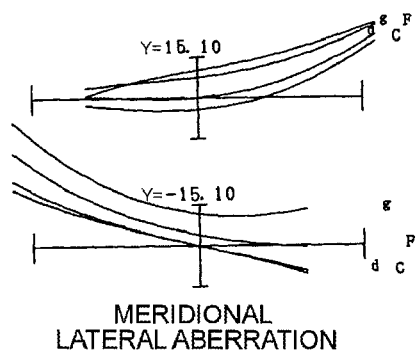

FIG. 23A and FIG. 23B are graphs showing various aberrations of the variable magnification optical system according to Example 4 upon focusing on infinity at the wide-angle end state, and graphs showing meridional lateral aberrations after blur correction is performed. FIG. 24 are graphs showing various aberrations of the variable magnification optical system according to Example 4 upon focusing on infinity at the intermediate focal length state. FIG. 25A and FIG. 25B are graphs showing various aberrations of the variable magnification optical system according to Example 4 upon focusing on infinity at the telephoto end state, and graphs showing meridional lateral aberrations after the blur correction is performed. FIG. 26A and FIG. 26B are graphs showing various aberrations of the variable magnification optical system according to Example 4 upon focusing on short range (lateral magnification of this optical system β=−0.033) at the wide-angle end state, and graphs showing meridional lateral aberrations after the blur correction is performed. FIG. 27 are graphs showing various aberrations of the variable magnification optical system according to Example 4 upon focusing on short range (lateral magnification of this optical system β=−0.033) at the intermediate focal length state. FIG. 28A and FIG. 28B are graphs showing various aberrations according to Example 4 upon focusing on short range (lateral magnification of this optical system β=−0.033) at the telephoto end state, and graphs showing the meridional lateral aberrations after blur correction is performed.

As each group showing aberrations clarifies, various Aberrations are corrected well in each focal length condition from the wide-angle end state to the telephoto end state, and excellent image forming performance is implemented in Example 4.

In the above embodiment, the following content can be used if necessary within a range where optical performance is not diminished.

In the above examples the variable magnification optical system has six lens groups, but the present invention can also be applied to seven lens groups, eight lens groups or other lens group configurations. In concrete terms, a configuration in which a positive lens group is added to the side closest to the object, or a configuration in which a positive or negative lens group is added to the side closest to the image, can be used.

A single lens group, a plurality of lens groups, or a part of a lens group, may be a focusing lens group which performs focusing from the object to infinity to an object in short range by moving the lens group in the optical axis direction. This focusing lens group can be applied to auto focus, and is also suitable for driving a motor for auto focus (e.g. ultrasonic motor). It is particularly preferable that the fifth lens group G5 is the focusing lens group.

A lens group or a part of a lens group may be a vibration isolation lens group which corrects an image blur due to hand motion by vibrating the lens group in a direction perpendicular to the optical axis. It is particularly preferable that at least a part of the second lens group G2 is the vibration isolation lens group.

Each lens group may be formed to be spherical, or a plane, or aspherical. It is preferable that the lens surface is spherical or plane, since lens processing and assembly adjustment are easy, and deterioration of optical performance due to processing and assembly adjustment errors can be prevented. Also in this case, even if the image plane is shifted, drawing performance is not affected much, which is preferable. If the lens surface is aspherical, this aspherical surface could be any one of an aspherical surface generated by grinding processing, a glass mold aspherical surface created by forming glass in an aspherical shape using a die, and a composite type aspherical surface created by forming resin in an aspherical shape. Each lens shape may be a diffraction surface, and the lens may be a distributed refractive index lens (GRIN lens) or plastic lens.

It is preferable that the aperture stop S is disposed near (preferably to the image side) of the fourth lens group G4 or near the third lens group G3, but the lens frame may substitute the role of the aperture stop without disposing an aperture stop as a separate element.

Each lens surface may be covered with an anti-reflection film having a high transmittance in a wide wavelength range, so as to decease flares and ghosts, and implement high optical performance with high contrast.

The variable magnification ratio of the variable magnification optical system of this embodiment is about 4.5 to 6.

In the variable magnification optical system of this embodiment, it is preferable that the first lens group G1 has two or three positive lenses and one negative lens. It is also preferable that the first lens group G1 has a negative, positive, positive (and positive) lenses in an arrangement order from the object.

In a variable magnification optical system of this embodiment, it is preferable that the second lens group G2 has two positive lenses and two or three negative lenses. It is preferable that the second lens group G2 has (a positive), negative, negative, positive and negative lenses in an arrangement order from the object. The arrangement of each cemented lens may be reversed.

In the variable magnification optical system of this embodiment, it is preferable that the third lens group G3 has two or three positive lenses and one negative lens. It is preferable that the third lens group G3 has a positive, positive, negative (and positive) lenses in an arrangement order from the object. The arrangement of the cemented lens of the lens L32 and the lens L33 may be reversed.

In the variable magnification optical system of this embodiment, the fourth lens group G4 may have a cemented lens of a positive lens and a negative lens.

In the variable magnification optical system of this embodiment, it is preferable that the fifth lens group G5 has two or three positive lenses and one negative lens. It is preferable that the fifth lens group G5 has a positive, positive, negative (and positive) lenses, or a positive, negative, positive (and positive) lenses in an arrangement order from the object.

In the variable magnification optical system of this embodiment, it is preferable that the sixth lens group G6 has one positive lens and one (or two) negative lens(es). In the cemented lens, the lens arrangement may be reversed, or two separate single lenses may be used instead.

The present invention was described using the configuration requirements of the embodiment, but needless to say, the present invention is not limited to this.

As described above, a variable magnification optical system, which has a good optical performance, is suitable for a camera for photographs, electronic still camera and video camera, and can perform focus at high-speed, and an optical apparatus having this variable magnification optical system, and the variable magnification method thereof can be provided.

Figure 30:
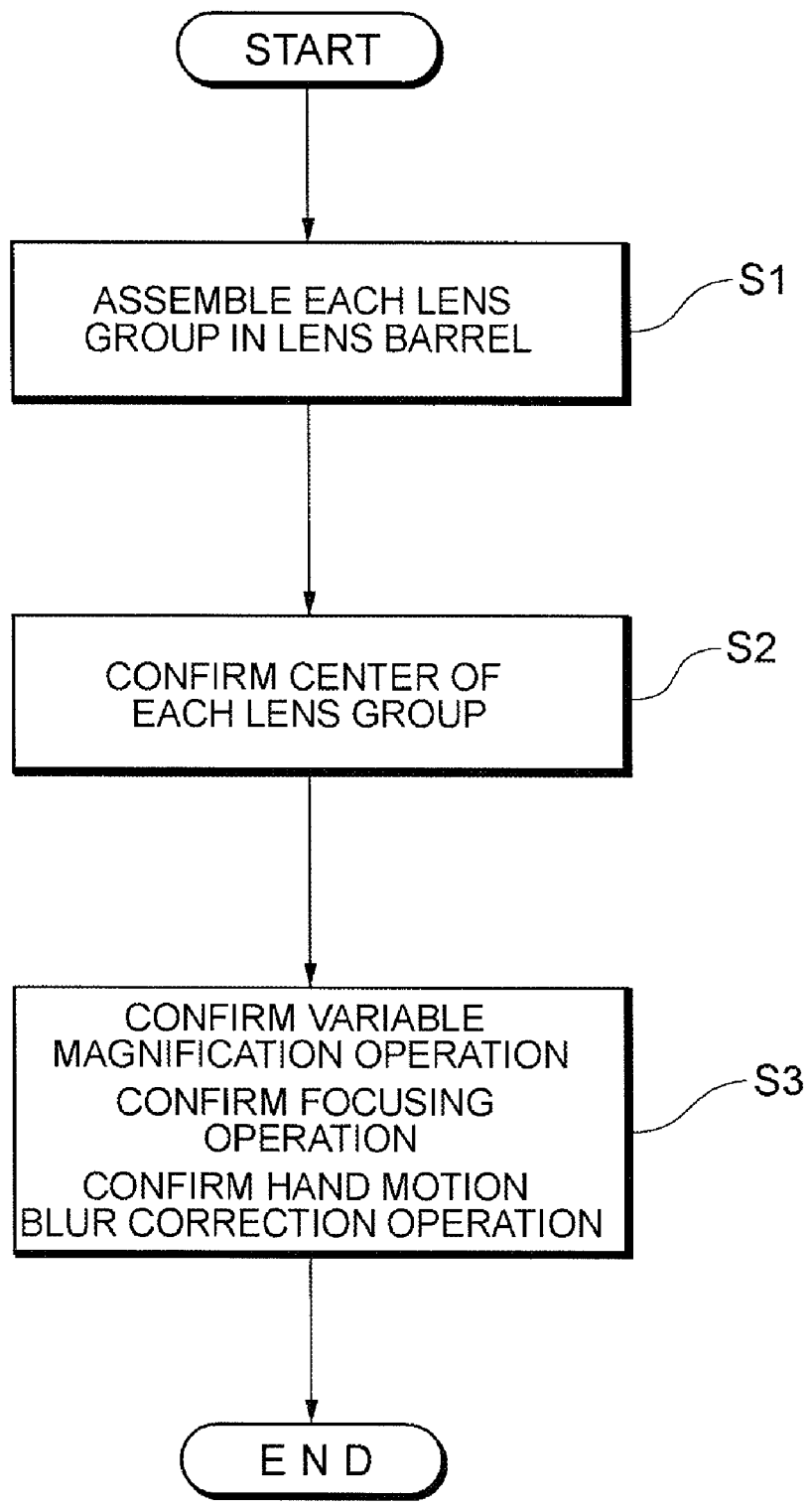
FIG. 30 is a flow chart depicting a method for manufacturing the above mentioned variable magnification optical system.

A method for manufacturing the variable magnification optical system will now be described with reference to FIG. 30. According to this method, the first lens group G1 to the sixth lens group G6 of this embodiment are assembled in a cylindrical lens barrel (step S1). When each lens group is assembled in the lens barrel, the lens groups may be assembled in the lens barrel one-by-one in order along the optical axis, or a part or all of the lens groups may be integrated and held in a holding element, and then assembled in the lens barrel. In the lens barrel of this embodiment, the fourth lens group G4 and the aperture stop S, of which positions in the optical axis direction are fixed upon zooming, may be disposed first in the lens barrel, so that the fifth lens group G5 and the sixth lens group G6 are disposed in this order, and then the third lens group G3, the second lens group G2 and the first lens group G1 are disposed in this order. After each lens group is assembled in the lens barrel, it is preferable to confirm that the image of the object is formed in a state of each lens group being assembled in the lens barrel, that is, to confirm that the center of each lens group is aligned (step S2).

After assembling the variable magnification optical system as above, various operations of the variable magnification optical system are confirmed (step S3). Examples of the various operations are the variable magnification operation of at least a part of the lens groups moving along the optical axis direction upon zooming, the focusing operation of the focusing lens group, which performs focus, from an object to infinity, to an object at short range, moving along the optical axis direction, and the motion blur correction operation of at least a part of the lenses moving so as to have components perpendicular to the optical axis. In this embodiment, the first lens group G1, the fourth lens group G4 and the aperture stop S are fixed in the optical axis direction with respect to the image plane upon zooming from the wide-angle end state to the telephoto end state. The confirmation sequence of various operations is arbitrary.

EXPLANATION OF NUMERALS AND CHARACTERS

G1 first lens group
G2 second lens group
G3 third lens group
G4 fourth lens group
G5 fifth lens group
G6 sixth lens group
S aperture stop
I image plane
CAM digital single-lens reflex camera (optical apparatus)

What is claimed is:
1. A variable magnification optical system comprising
a first to sixth lens groups disposed along an optical axis, and
the fifth lens group satisfying the following conditional expression:

$$0.65 < |\beta 5T/\beta 5W| < 3.20$$

where $\beta 5T$ denotes a lateral magnification at a telephoto end state and $\beta 5W$ denotes a lateral magnification at a wide-angle end state.

2. The variable magnification optical system according to claim 1, characterized in that the following conditional expression is satisfied:

$$2.90 < TLW/fW < 6.60$$

where TLW denotes a total length of the variable magnification optical system at the wide-angle end state, and fW denotes a focal length of the variable magnification optical system at the wide-angle end state.

3. The variable magnification optical system according to claim 1, characterized in that the following conditional expression is satisfied:

$$0.643 < TLT/fT < 0.692$$

where TLT denotes a total length of the variable magnification optical system at the telephoto end state, and fT denotes a focal length of the variable magnification optical system at the telephoto end state.

4. The variable magnification optical system according to claim 1, characterized in that a distance between the first lens group and the second lens group increases, a distance between the second lens group and the third lens group decreases, and a distance between the third lens group and the fourth lens group increases upon zooming from the wide-angle end state to the telephoto end state.

5. The variable magnification optical system according to claim 1, characterized in that a lens group disposed closest to an object has positive refractive power.

6. The variable magnification optical system according to claim 1, characterized in that the lens group disposed closest to the object is fixed in an optical axis direction with respect to an image plane upon zooming from the wide-angle end state to the telephoto end state.

7. The variable magnification optical system according to claim 1, characterized in that the second lens group satisfies the following conditional expression:

$$\beta 2T/\beta 2W < 6.100$$

where $\beta 2T$ denotes a lateral magnification at the telephoto end state and $\beta 2W$ denotes a lateral magnification at the wide-angle end state.

8. The variable magnification optical system according to claim 1, characterized in that the following conditional expression is satisfied:

$$|f3/f2| < 1.800$$

where f2 denotes a focal length of the second lens group and f3 denotes a focal length of the third lens group.

9. The variable magnification optical system according to claim 1, characterized in that a lens group disposed to the object side of the fifth lens group has negative refractive power.

10. The variable magnification optical system according to claim 1, characterized in that a lens group disposed to an image side of the fifth lens group has negative refractive power.

11. The variable magnification optical system according to claim 1, characterized in that the second lens group has negative refractive power, and
the third lens group and the fifth lens group have positive refractive power.

12. The variable magnification optical system according to claim 1, characterized in that the fourth lens group is fixed in the optical axis direction with respect to the image plane upon zooming from the wide-angle end state to the telephoto end state.

13. The variable magnification optical system according to claim 1, characterized in that a stop is disposed to the object side or the image side of the fourth lens group, and
    is fixed in the optical axis direction with respect to the image plane upon zooming from the wide-angle end state to the telephoto end state.

14. The variable magnification optical system according to claim 1, characterized in that all or a part of the second lens group is moved so as to have a component perpendicular to the optical axis.

15. The variable magnification optical system according to claim 1, characterized in that focusing is performed by moving the fifth lens group.

16. An optical apparatus having the variable magnification optical system according to claim 1.

17. A method for manufacturing a variable magnification optical system, comprising a step of disposing a first to sixth lens groups along an optical axis, and
    the fifth lens group being disposed so as to satisfy the following conditional expression:

$$0.65 < |\beta 5T/\beta 5W| < 3.20$$

where $\beta 5T$ denotes a lateral magnification at a telephoto end state and $\beta 5W$ denotes a lateral magnification at a wide-angle end state.

* * * * *